US012685299B1

(12) United States Patent

Milton

(10) Patent No.: US 12,685,299 B1

(45) Date of Patent: Jul. 21, 2026

(54) ROTATABLE LINE TRANSFER MEMBER FOR A FISHING REEL WITH LEVER ACTUATION

(71) Applicant: James Edwards Milton, Malaga, NJ (US)

(72) Inventor: James Edwards Milton, Malaga, NJ (US)

( * ) Notice: Subject to any disclaimer, the term of this patent is extended or adjusted under 35 U.S.C. 154(b) by 0 days.

(21) Appl. No.: 19/405,598

(22) Filed: Dec. 2, 2025

Related U.S. Application Data

(63) Continuation-in-part of application No. 29/997,631, filed on Apr. 9, 2025, now Pat. No. Des. 1,107,170.

(60) Provisional application No. 63/761,169, filed on Feb. 21, 2025.

(51) Int. Cl.
| | |
|---|---|
| *A01K 89/01* | (2006.01) |
| *A01K 89/015* | (2006.01) |
| *A01K 89/06* | (2006.01) |

(52) U.S. Cl.
CPC ...... *A01K 89/0176* (2015.05); *A01K 89/0117* (2013.01); *A01K 89/06* (2013.01)

(58) Field of Classification Search
CPC .......... A01K 89/0102; A01K 89/01084; A01K 89/01086; A01K 89/01087; A01K 89/0176
See application file for complete search history.

(56) References Cited

U.S. PATENT DOCUMENTS

| | | | | |
|---|---|---|---|---|
| 2,561,935 | A * | 7/1951 | Mccash | A01K 89/0193 242/271 |
| 2,621,869 | A * | 12/1952 | Mccash | A01K 89/015 242/228 |
| 2,723,808 | A * | 11/1955 | Elliott | A01K 89/0176 242/301 |
| 2,941,747 | A * | 6/1960 | Schmidt | A01K 89/015 242/301 |
| 3,379,391 | A * | 4/1968 | Fincannon | A01K 89/0176 242/228 |
| 3,417,502 | A * | 12/1968 | Thomas | A01K 89/015 43/6.5 |
| 3,685,762 | A * | 8/1972 | Winfree | A01K 89/015 242/270 |
| 4,130,251 | A * | 12/1978 | Findley | A01K 89/015 242/321 |
| 4,145,015 | A * | 3/1979 | Noda | A01K 89/0102 242/237 |
| 4,359,196 | A * | 11/1982 | Puryear | A01K 89/0102 220/301 |
| 11,974,557 | B2 * | 5/2024 | Milton | A01K 89/0108 |
| 12,102,073 | B2 * | 10/2024 | Milton | A01K 89/06 |
| 2003/0132337 | A1 * | 7/2003 | Wethington | B65H 49/205 242/588.1 |

(Continued)

*Primary Examiner* — Emmanuel M Marcelo

(74) *Attorney, Agent, or Firm* — Ashok Tankha

(57) ABSTRACT

A fishing reel having a lever actuated rotatable line transfer member comprises a reel body, a spool rotatably mounted on the reel body, the rotatable line transfer member mounted on the reel body for rotation about a central axis between a retrieve position and a cast position, with a lever extending through a slot in the reel body and operatively coupled to the rotatable line-transfer member. The lever is engaged in slidable communication between a first end and a second end of the slot in the reel body to rotate the rotatable line-transfer member to the retrieve position and the cast position, respectively.

18 Claims, 31 Drawing Sheets

(56) References Cited

U.S. PATENT DOCUMENTS

| | | | |
|---|---|---|---|
| 2012/0001007 A1* | 1/2012 | Bloemendaal ......... | A01K 89/06 |
| | | | 242/283 |
| 2022/0394968 A1* | 12/2022 | Milton ............... | A01K 89/0176 |
| 2023/0270093 A1* | 8/2023 | Milton ............... | A01K 89/0102 |
| | | | 242/310 |

* cited by examiner

100a

900

100a

1800

1800a

150j

210

150f

200

150

130c

130b

1100

150a

150c

150g

140

810

820f

820c

820h

150h

100a

ROTATABLE LINE TRANSFER MEMBER FOR A FISHING REEL WITH LEVER ACTUATION

CROSS-REFERENCE TO RELATED APPLICATIONS

This application claims priority to and the benefit of the provisional patent application titled "Rotatable Line Transfer member For A Fishing Reel With Lever Actuation", application No. 63/761,169, filed in the United States Patent and Trademark Office on Feb. 21, 20025. This application is a continuation-in-part (CIP) of design patent application titled "Rotatable Line Transfer member For A Fishing Reel", application Ser. No. 29/997,631, filed in the United States Patent and Trademark Office on Apr. 9, 2025. The specifications of the above referenced patent applications are incorporated herein by reference in their entirety.

FIELD OF THE INVENTION

The apparatus disclosed herein, in general, relates to a fishing reel. More particularly, the apparatus disclosed herein relates to a rotatable line transfer member for a fishing reel, which can be rotated using a lever to selectively transfer a fishing line between a cast mode and a retrieve mode.

BACKGROUND

Fishing, also referred to as angling, is a sport of catching fish, typically using a fishing rod, a fishing reel, a fishing line, a hook, and a bait. FIG. 1A illustrates a fishing rod 100 comprising a fishing reel 100a, a fishing line 170, a hook 110, and a bait 120. An angler attaches the hook 110 to the fishing line 170, which is attached to the fishing rod 100, typically fitted with a fishing reel 100a. The fishing reel 100a is typically attached proximal to a handle 100b of the fishing rod 100. One type of fishing reel 100a used by most anglers is a spinning reel. FIG. 1B exemplarily illustrates a fishing rod 100 comprising a spinning reel 111. As shown in FIG. 1B, the spinning reel 111 is configured with an open face 112 and a bail 113. The spinning reel 111 further comprises a fixed spool 140 for holding the fishing line 170 that is wound around the central axis 200 of the spool 140, and a hand crank 150j for retrieving the fishing line 170. An angler rotates the hand crank 150j of the spinning reel 111 to retrieve the fishing line 170. The spinning reel 111 further comprises a reel body which is composed of a reel foot 210 and a gear box that is coupled to the hand crank 150j and a spindle (not shown). The gear box, exemplarily illustrated in FIG. 4 by the numeral 1501, is configured to amplify the number of spindle rotations for each rotation of the hand crank 150j shown in FIG. 1A. The spool 140 stays stationary on the spindle (not shown) during casting of the fishing line 170. The gear box 150l rotates the bail 113 when the fishing line 170 is retrieved. The bail 113 wraps the fishing line 170 around the stationary spool 140. An angler casts the fishing line 170 by grasping the fishing line 170 with a forefinger against the handle 100b of the fishing rod 100, opening the bail 113, and then performing a backward swing of the fishing rod 100 followed by a forward cast while releasing the fishing line 170 with the forefinger. During the retrieve, the angler operates the hand crank 150j of the spinning reel 111 with one hand, while the large rotating bail 113 serves as a line pickup, restoring the fishing line 170 to its original position on the spool 140. When the fishing line 170 is wound on the spool 140 by the rotating bail 113, the fishing line 170 undergoes a change of direction, and thereby imparts a twist to the fishing line 170. The fishing line 170, thus being twisted, with an indirect line take-up, eventually results in undesirable snarls in the fishing line 170, requiring more frequent line replacement.

The design of conventional spinning reels 111 exhibits a tendency to twist and untwist the fishing line 170 as the fishing line 170 is cast and retrieved. The spool 140 is typically the point of a conventional spinning reel 111 where the fishing line 170 is most prone to twist or tangle. Substantial friction on the fishing line 170 by the spool 140 results in breakage of the fishing line 170. Moreover, improper winding of the fishing line 170 onto the spool 140 by the rotating bail 113 causes the fishing line 170 to be trapped underneath itself on the spool 140 or even detach from the spinning reel 111 in loose loops of fishing line 170. Conventional direct-to-reel spool retrieve type reels, also referred to as conventional or bait casting reels, have a limited ability to freely cast bait. Direct-to-reel line retrieval imparts no line twist, which is preferred for reeling in fish. The spinning reel 111 changes the direction of the fishing line 170 when the fishing line 170 is being wound onto the spool 140 of the spinning reel 111, thereby imparting a line twist. If an angler turns the hand crank 150j of the spinning reel 111 while encountering large fish with much resistance, the fishing line 170 typically twists into an uncontrollable snarl that eventually ruins the fishing line 170. Over a period of time, casting and retrieving the fishing line 170 accumulates more and more twist, because the angler has no method of countering the accumulation of the twist of the fishing line 170, thereby ruining and rendering the fishing line 170 unusable.

Fishing reels 100a utilize line transfer members to guide the fishing line 170 onto the spool 140 during retrieval and to control line payout during casting. Conventional line transfer members often require manual adjustment or complex mechanisms for transitioning between retrieve and cast modes. U.S. Pat. No. 11,974,557B2 discloses a rotatable line transfer mechanism that simplifies this process. In the rotatable line transfer mechanism disclosed in U.S. Pat. No. 11,974,557B2, the angler has to reach with their opposite free hand and go over or under the reel and with the free hand, rotate the line transfer mechanism to the desired retrieve or cast position. Rotating the line transfer mechanism in this manner is awkward and cumbersome. Hence, there is a long felt yet unresolved need for a more user-friendly apparatus for controlling the rotation of the rotatable line transfer mechanism.

DETAILED DESCRIPTION OF THE INVENTION

The apparatus disclosed herein addresses the above-recited need for a more user friendly apparatus for controlling the rotation of a rotatable line transfer mechanism. The apparatus disclosed herein provides a means for rotating the rotatable line transfer mechanism without having the angler reach with their free hand and go over or under the reel with the free hand.

Figure 1A:
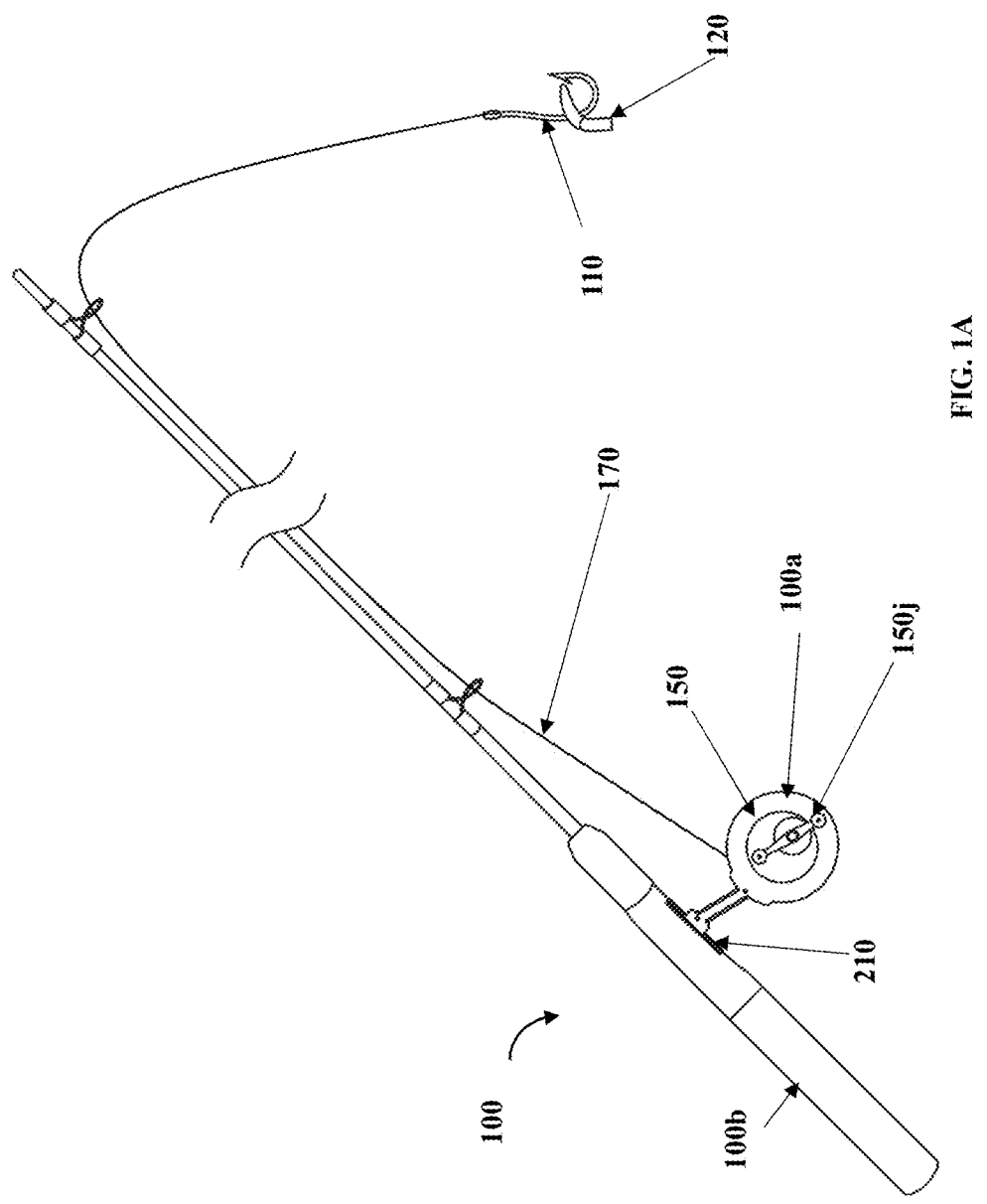
FIG. 1A illustrates a fishing rod comprising a fishing reel, a fishing line, a hook, and a bait.
Figure 1B:
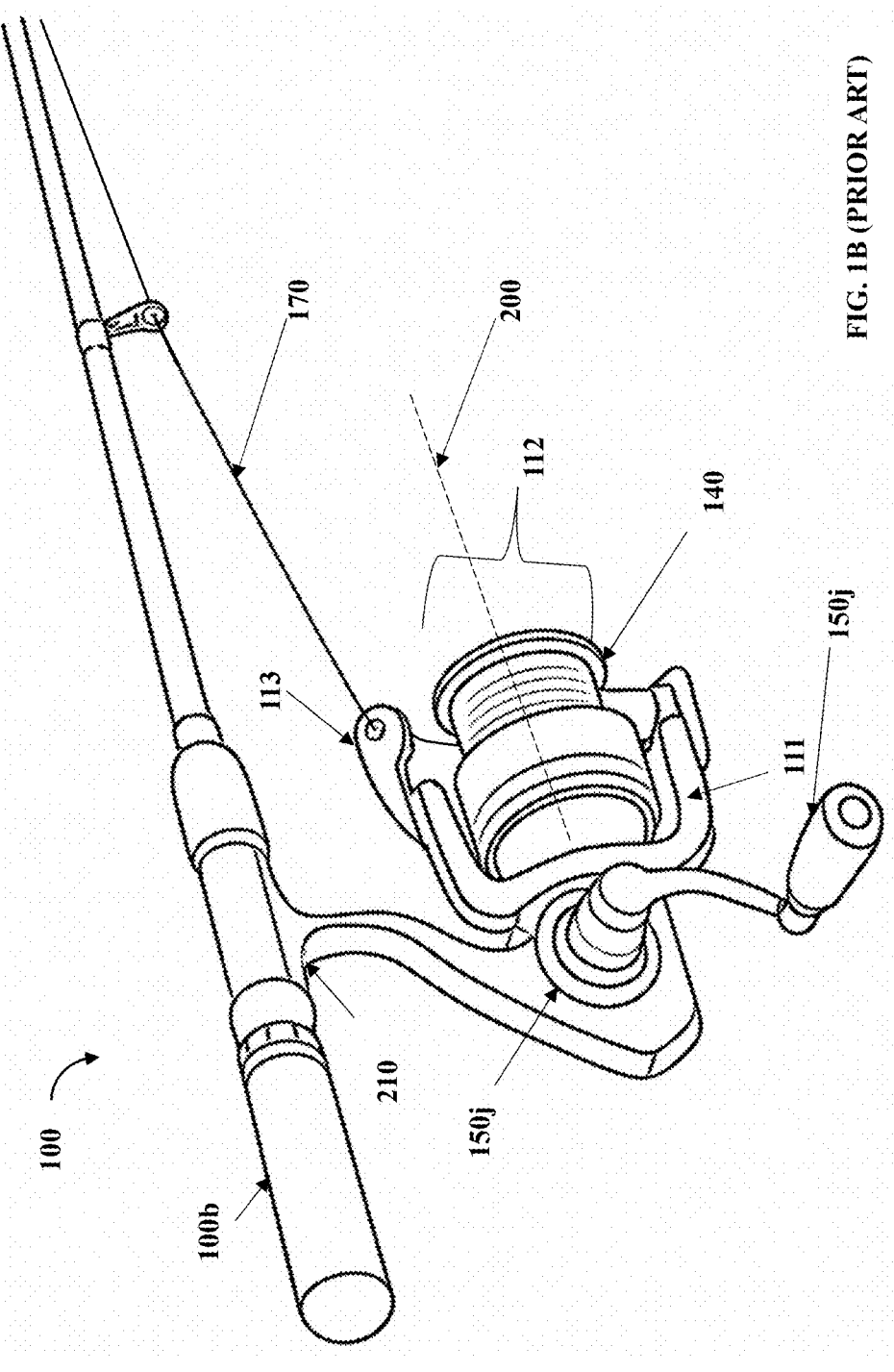
FIG. 1B exemplarily illustrates a fishing rod comprising a spinning reel.
Figure 2A:
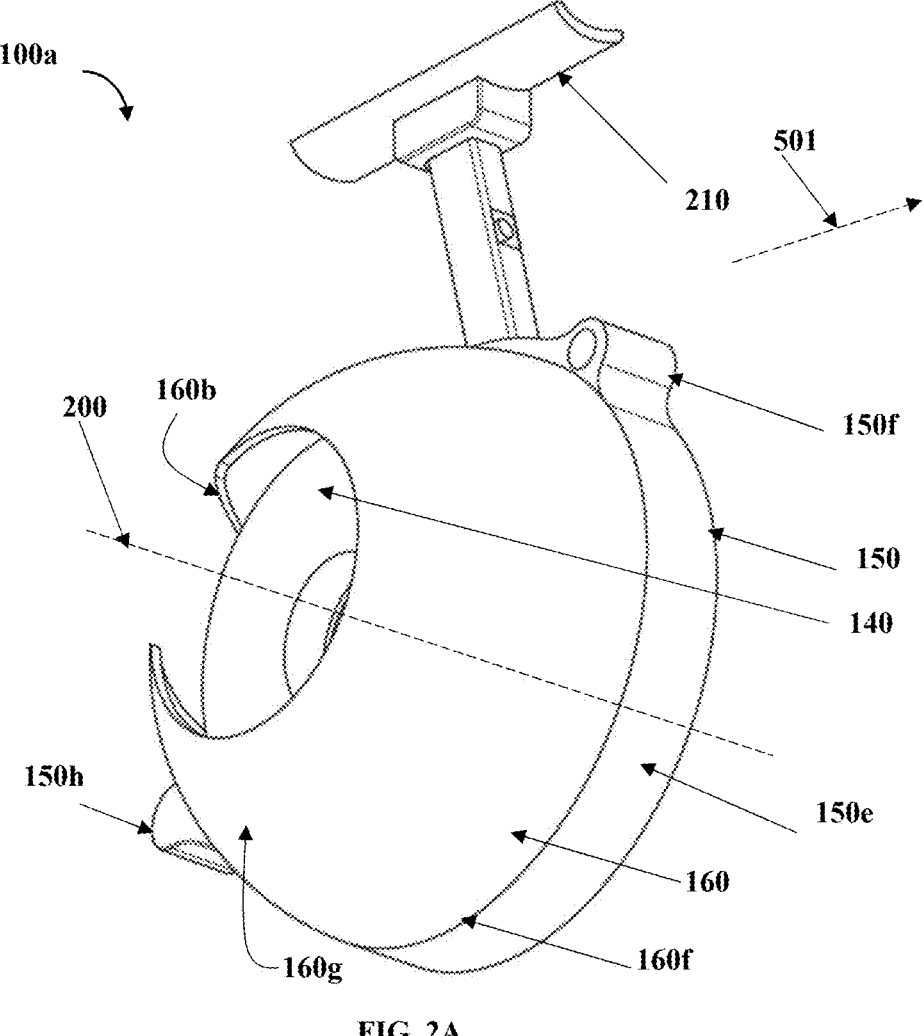
FIG. 2A illustrates a right-side perspective view of a fishing reel comprising a rotatable line transfer member with the line transfer member turned to a cast position.
Figure 2B:
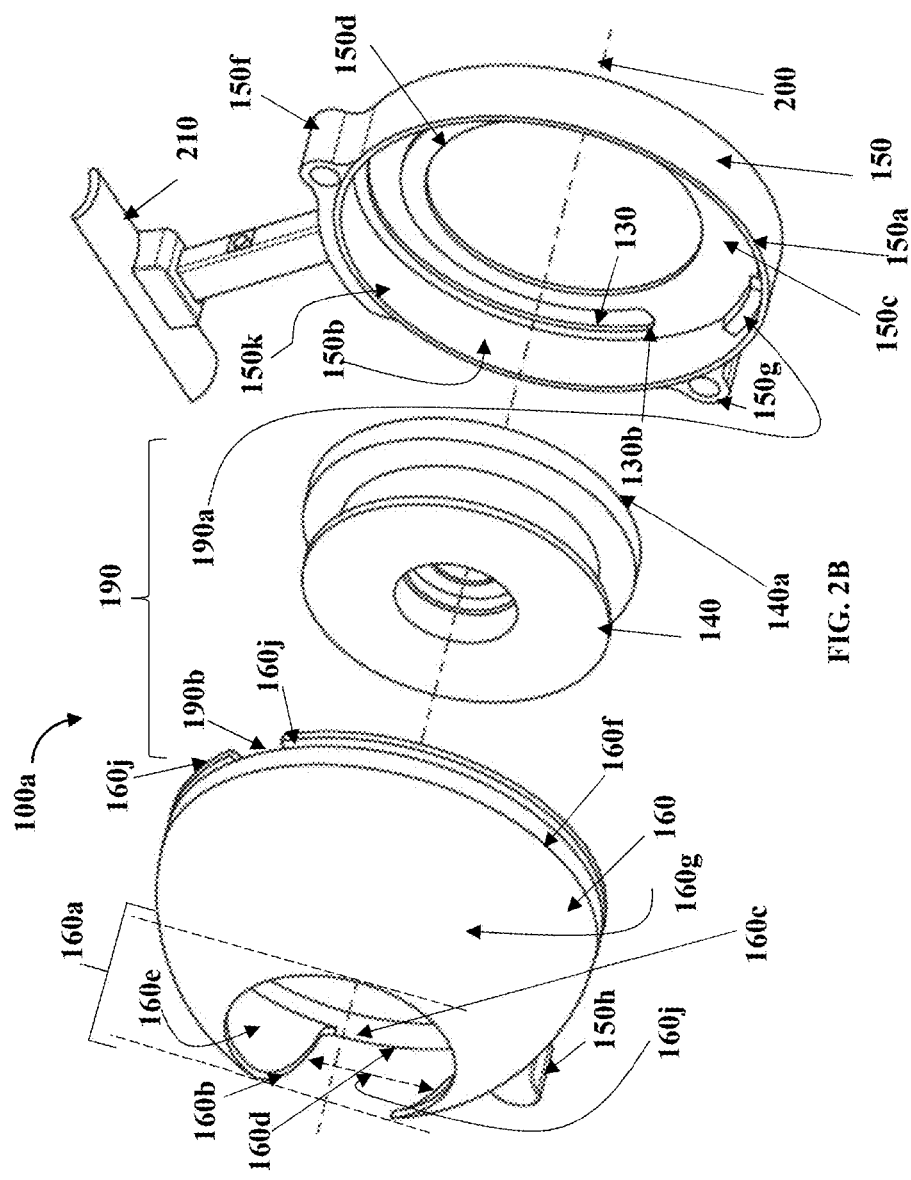
FIG. 2B illustrates an exploded view of the fishing reel shown in FIG. 2A.
Figure 3:
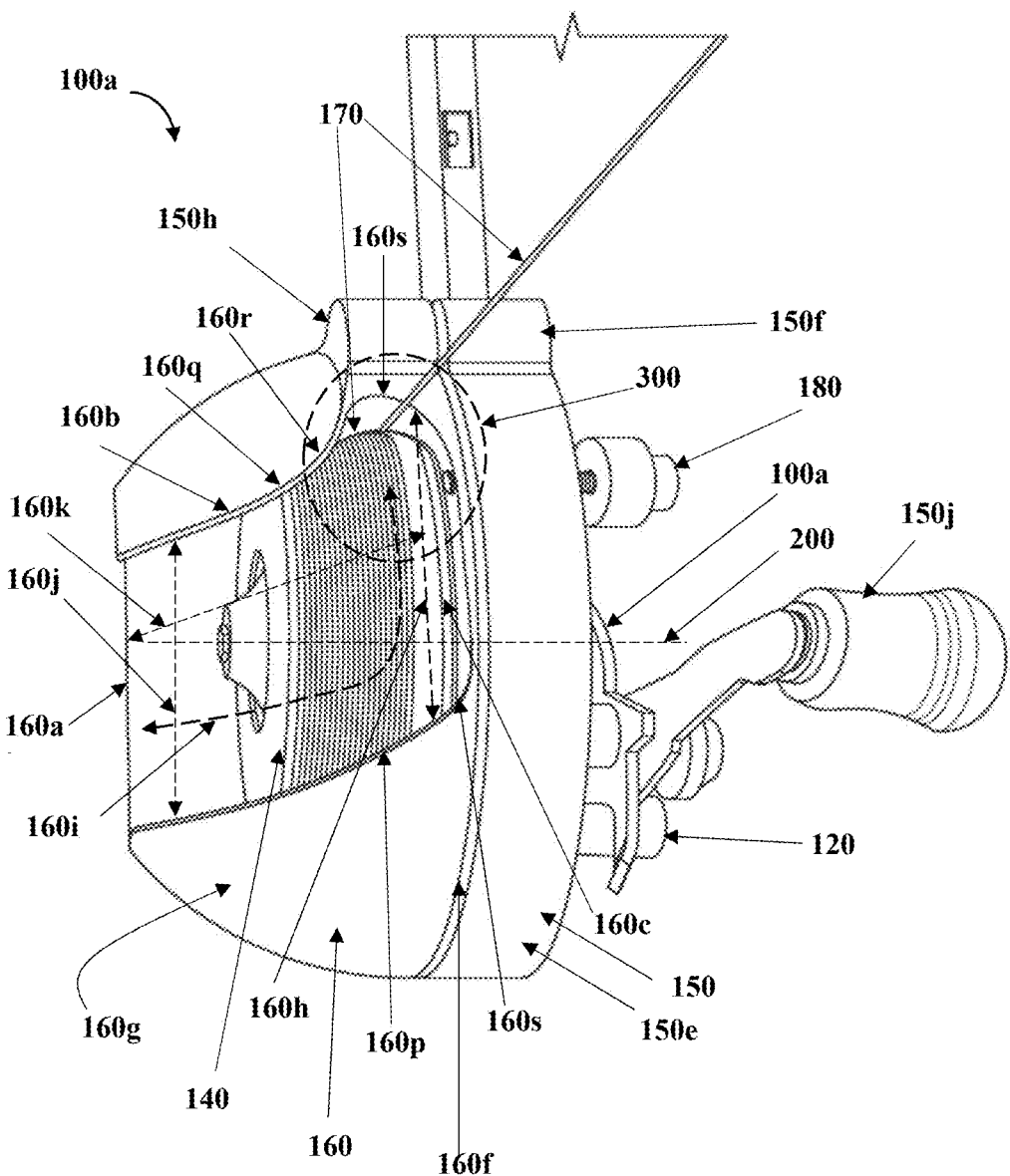
FIG. 3 illustrates a right-side perspective view of the fishing reel showing a lever slidably passing through a slot in the reel body and rigidly coupled to the rotatable line transfer member while in retrieve position.
Figure 5A:
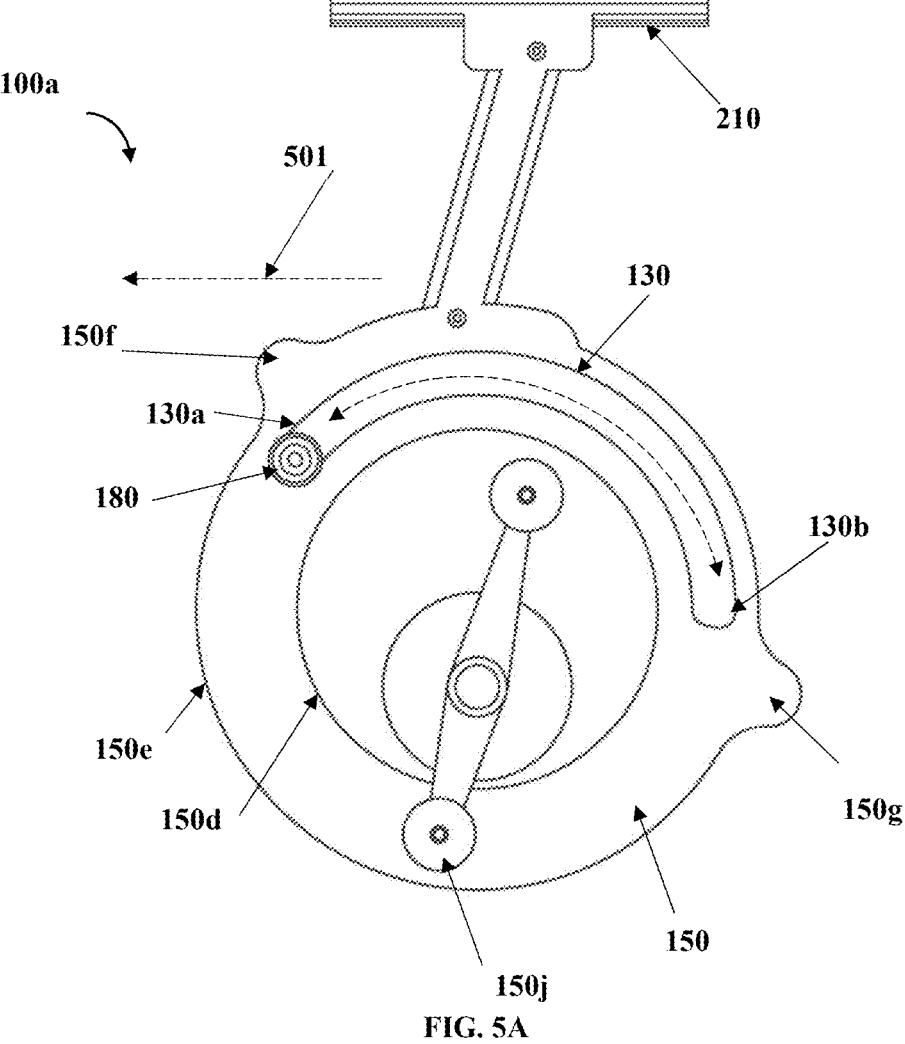
FIG. 5A illustrates a left-side view of the fishing reel showing the lever positioned in the first end of the slot.

FIG. 1A illustrates a fishing rod 100 comprising a fishing reel 100a, a fishing line 170, a hook 120, and a bait 110. FIG. 1B exemplarily illustrates a fishing rod 100 comprising a spinning reel 111. FIG. 2A illustrates a right-side perspective view of a fishing reel 100a comprising a rotatable line transfer member 160 with the line transfer member 160 turned to a cast position. FIG. 2B illustrates an exploded view of the fishing reel 100a shown in FIG. 2B. It should be noted that all drawings and descriptions are based on what would be described for a right-handed version of the fishing reel 100a. A left-handed version of the fishing reel 100a is a "mirror image" or a "mirror version" of the right-handed version of the fishing reel 100a disclosed herein. FIG. 3 illustrates a right-side view of the fishing reel 100a showing a lever 180 slidably passing through a slot 130 in a reel body 150 and rigidly coupled to the rotatable line transfer member 160 while in a retrieve position. As shown in FIG. 3, the fishing reel 100a comprising the reel body 150, a spool 140 mounted on the reel body 150, and the rotatable line transfer member 160. The spool 140 comprises a central axis 200, as shown in FIGS. 2A-3. The rotatable line transfer member 160 is mounted to the reel body 150 for rotation about the central axis 200 of the spool 140 between (i) a retrieve position in which a line slot 160b of the rotatable line-transfer member 160 guides a fishing line 170 during retrieval and (ii) a cast position in which the fishing line 170 is permitted to payout from the spool 140. The fishing reel 100a further comprises the lever 180 extending through the slot 130 in the reel body 150 and operatively coupled to the rotatable line-transfer member 160. Lever 180 is engaged in slidable communication between a first end 130a and a second end 130b of the slot 130, as shown in FIG. 5A, to rotate the rotatable line-transfer member 160 respectively to the retrieve position and the cast position. As shown in FIG. 5A, slot 130 is a circular slot made to match the radial of the rotatable line-transfer member 160 to allow for smooth rotation of the rotatable line-transfer member 160. The reel body 150 accommodates the spool 140, more particularly a rear portion 140a of the spool 140, as shown in FIG. 2B.

Figure 4:
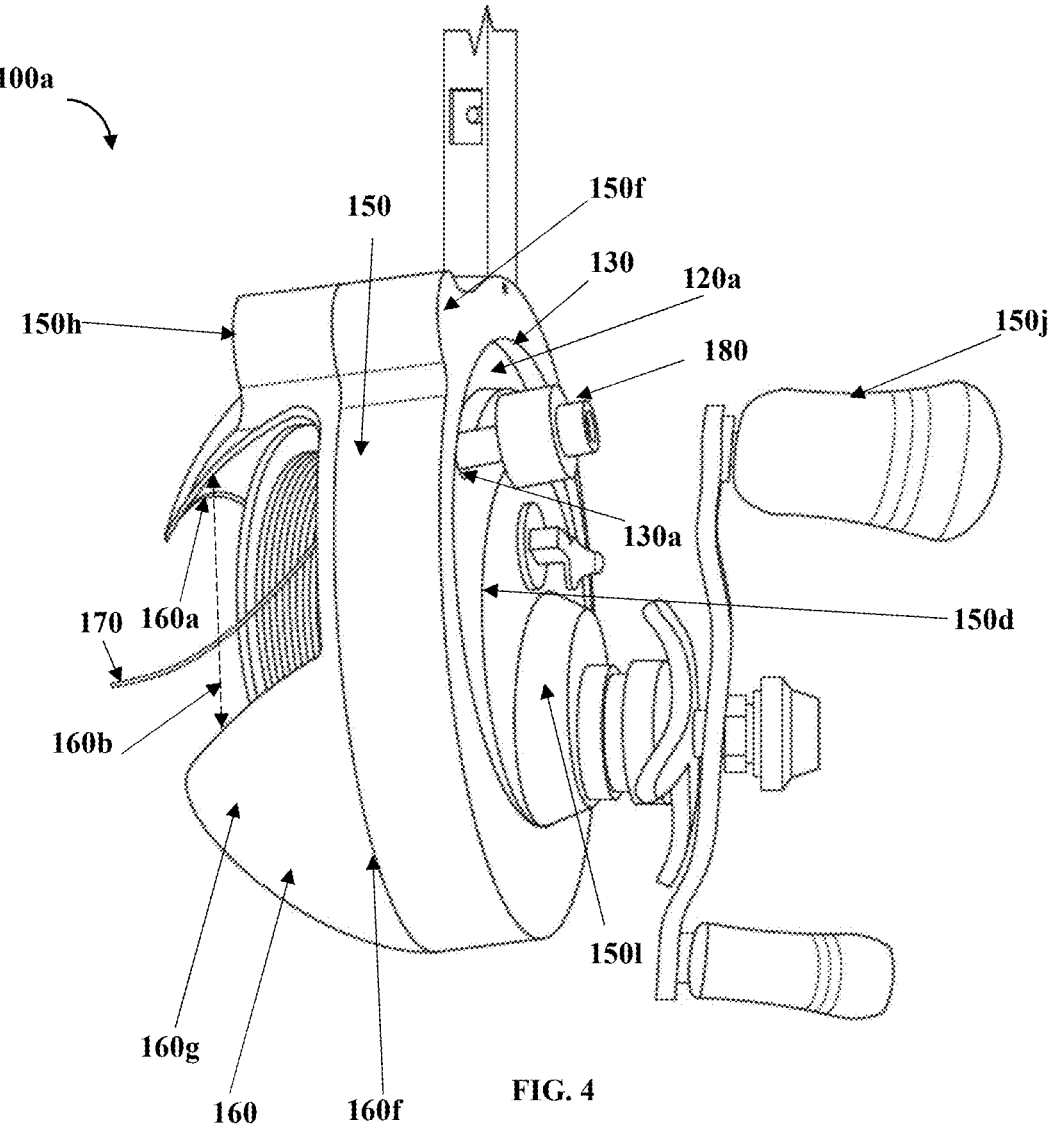
FIG. 4 illustrates a front view of the fishing reel showing the lever positioned in a first end of the slot positioning the rotatable line transfer member in a retrieve position.

FIG. 3 illustrates a right-side perspective view of the fishing reel 100a showing the lever 180. The lever 180 slidably extends through the slot 130 in the reel body 150, and is rigidly and operatively coupled to the rotatable line transfer member 160. The lever 180, shown in FIGS. 3 and 4, is operatively coupled to the rotatable line transfer member 160 through the slot 130, shown in FIG. 2B, in the reel body 150. FIG. 4 illustrates a rear perspective view of the fishing reel 100a showing the lever 180 positioned in a first end 130a of the slot 130 positioning the rotatable line transfer member 160 in a retrieve position. In an embodiment, the line slot 160b of the rotatable line-transfer member 160 substantially frictionlessly guides the fishing line 170 to the spool 140. During retrieval of the fishing line 170 to the spool 140, the fishing line 170 is wound directly in a straight line to the spool 140 with no line redirection. Furthermore, during retrieval, the fishing line 170 is being wound under tension and there is no need to touch anything, for example, any part of the reel body, spool, etc., to provide control of the fishing line 170 as it is being wound onto the spool 140. Portions of the rotatable line-transfer member 160 surround the area 300 that the fishing line 170 is passing through toward the spool 140, as shown in FIG. 3. These portions of the rotatable line-transfer member 160, during a period that the fishing line 170 may become slack, will help keep the fishing line 170 within this area 300 without the fishing line 170 becoming possibly entangled upon something unwanted. While the fishing line 170 is within this area 300 it will be ready to be retrieved and wound upon the spool 140 with no guidance from the angler.

In an embodiment, the lever 180 is an extended part of the rotatable line transfer member 160. The lever 180 is engaged in slidable communication between a first end 130*a* and a second end 130*b* of the slot 130 on the rotatable line-transfer member 160. Sliding the lever 180 between the first end 130*a* to the second end of the slot 130 on the rotatable line-transfer member 160, rotates the rotatable line transfer member 160 between the retrieve position when the lever 180 is at the first end 130*a* of the slot 130, shown in FIGS. 4 and 5A, to the cast position when the lever 180 is at the second end 130*b* of the slot 130, shown in FIG. 2B. In an embodiment, the lever 180 may be moved between the retrieve position and the cast position by using the second hand of the user while the first hand of the user holds the fishing rod and reel (not shown), and the forefinger of the first hand holds the fishing line 170, shown in FIG. 3, during cast procedure.

As illustrated in FIGS. 2A, 2B and 3, the rotatable line transfer member 160 comprises a dome-shaped body 160*g* with a truncated top 160*a*. The rotatable line transfer member 160 further comprises a line slot 160*b*. As shown in FIG. 3, the line slot 160*b* comprises an L-shaped channel 160*i*, having a radial segment 160*k* and a circumferential segment 160*h*. The circumferential segment 160*h* is located adjacent to the perimeter 160*f* of the dome-shaped body 160*g* of the rotatable line-transfer member 160. The radial segment 160*k* extends from an opening of the truncated top 160*a* of the dome-shaped rotatable line transfer member 160 till a portion 160*c* of the line transfer member 160 that is proximal to a circumference 160*d* of the rotatable line transfer member 160. As shown in FIG. 3, the L-shaped channel 160*i* of the line slot 160*b* has a slanted L-shape with the circumferential segment 160*h* of the slanted L-shape being substantially parallel to circumference of the dome-shaped body of the rotatable line-transfer member 160. Furthermore, in an embodiment, an angle between the circumferential segment 160*h* and the radial segment 160*k* of the slanted L-shape line slot 160*b* is an acute angle. In an embodiment, sides 160*p* and 160*q* of the line slot 160*b* are non-linear, as shown in FIG. 3. As shown in FIG. 3, the sides 160*p* and 160*q* are curved or rounded-off at corners 160*s* and edges 160*r* in the line slot 160*b* to enable smooth flow of the fishing line 170 in the line slot 160*b* during transitions between casting and retrieving. In another embodiment, sides 160*p* and 160*q* of the line slot 160*b* are substantially linear.

As shown in FIG. 3, the dome-shaped body 160*g* of the rotatable line-transfer member 160 defines a cavity 160*e* configured to partially surround the spool 140. The truncated top 160*a* and the line slot 160*b* of the rotatable line transfer member 160 are configured to receive and pass a fishing line 170 from and to the spool 140 of the fishing reel 100*a*.

FIG. 4 illustrates a front perspective view of the fishing reel 100*a* showing the lever 180 positioned in a first end 130*a* of the slot 130 positioning the rotatable line transfer member 160 in a retrieve position. The fishing reel 100*a* comprises a reel foot 210, a stem 210*a*, the round reel body 150 which houses a gear box 1501 of the fishing reel 100*a* that has the hand crank 150*j* on one side and a shaft (not shown) on the other side that the spool 140 is mounted to. The reel body 150 has the slot 130 cut through it that can be seen from both sides. As shown in FIG. 2B, the reel body 150 comprises a generally cylindrical receptacle 150*a* configured to partially surround the rear of the gear box 1501 of the of the fishing reel 100*a*. The generally cylindrical receptacle 150*a* further comprises a generally cylindrical wall 150*b* and a flat annular base 150*c*. The reel body 150 accommodates the gear box 1501 comprising a system of gears (not shown) of the fishing reel 100*a*. An opening 150*d* in the flat annular base 150*c* of the generally cylindrical receptacle 150*a* accommodates the rear portion of the gear box 1501 of the of the fishing reel 100*a* illustrated in FIG. 3.

As illustrated in FIG. 5A, the slot 130 in the reel body 150 is a guide track for the lever 180 to be guided from the first end 130*a* of the slot 130 to the second end 130*b* of the slot 130. The slot 130 constrains the lever's 180 movement, enabling it to rotate the line transfer member 160. The lever 180 slidably engages with the slot 130 to rotate the rotatable line transfer member 160 between the retrieve position when the lever 180 is moved to the first end 130*a* of the slot 130, and the cast position when the lever 180 is moved to the second end 130*b* of the slot 130. The first and second ends 130*a* and 130*b* of the slot 130 correspond to the retrieve position and the cast position of the rotatable line transfer member 160. Sliding the lever 180 to the cast position rotates the rotatable line transfer member 160 to the cast position, allowing line 170 to freely payout from the spool 140. Sliding the lever 180 to the retrieve position rotates the line transfer member 160 to the retrieve position, enabling the retrieval of line 170.

Figure 5B:
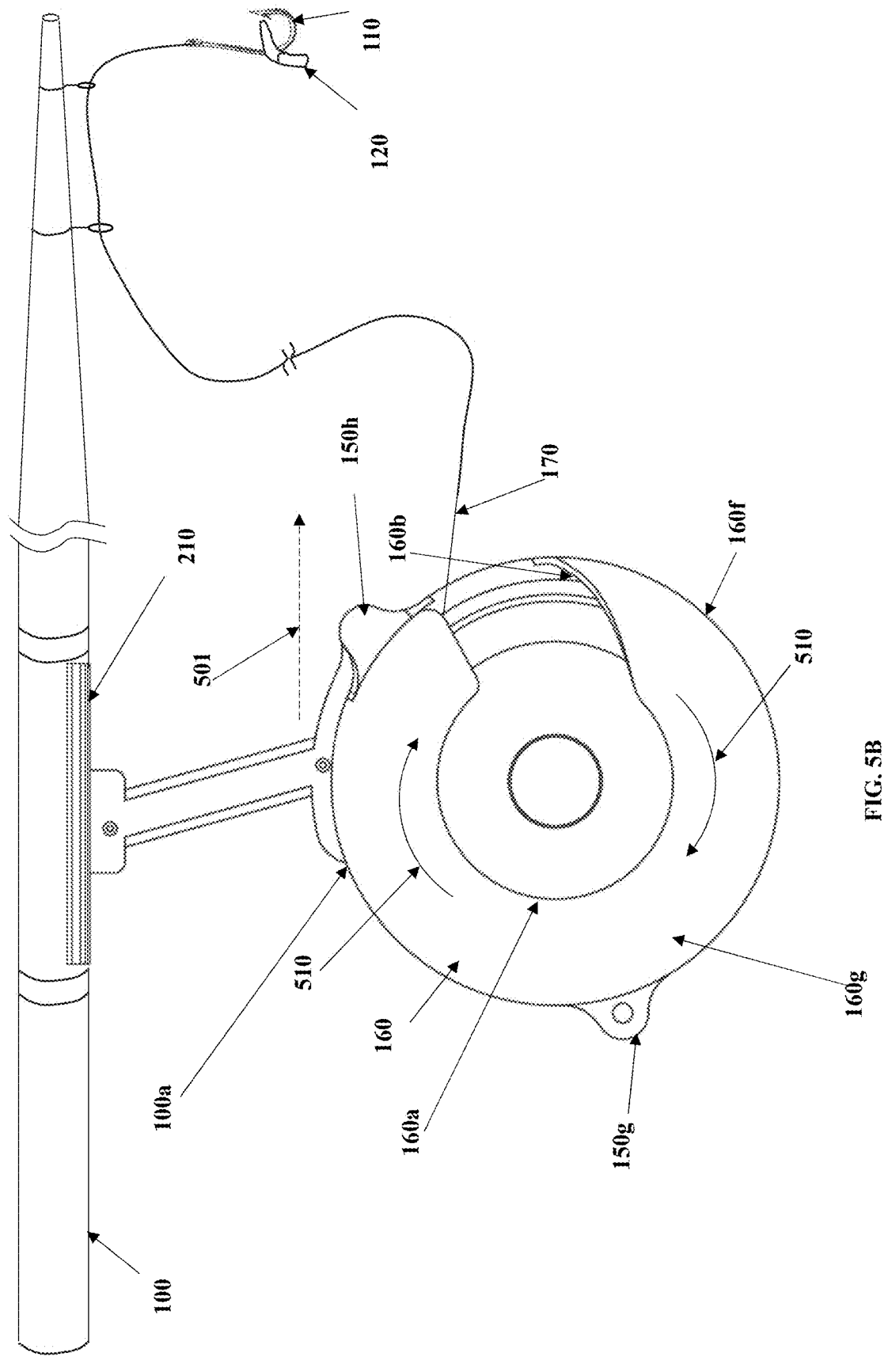
FIG. 5B illustrates a right-side view of the fishing reel showing the position of the rotatable line transfer member when the lever is positioned in the first end of the slot.

As illustrated in FIG. 4, the rotatable line transfer member 160 is in the retrieve position. FIG. 5A illustrates a left-side view of the fishing reel 100*a* showing the lever 180 positioned in the first end 130*a* of the slot 130. FIG. 5B illustrates a right-side view of the fishing reel 100*a* showing the position of the rotatable line transfer member 160 when the lever 180 is positioned in the first end 130*a* of the slot 130. As illustrated in FIGS. 2, 5A and 5B, the rotatable line transfer member 160 is configured to be rotated about the central axis 200 of the spool 140, in a first direction 501 to position the fishing line 170 in the line slot 160*b* during the retrieve mode. The first direction 501 is illustrated is FIGS. 2, 5A and 5B.

As illustrated in FIGS. 6A-7B and 14A-14B, the rotatable line transfer member 160 is configured to be rotated about the axis of rotation of the spool 140 in a second direction 600 opposite to the first direction 501 to position the fishing line 170 in the truncated, cut-off top 160*a* of the dome-shaped body 160*g* of the rotatable line transfer member 160 during the cast mode.

Figure 6A:
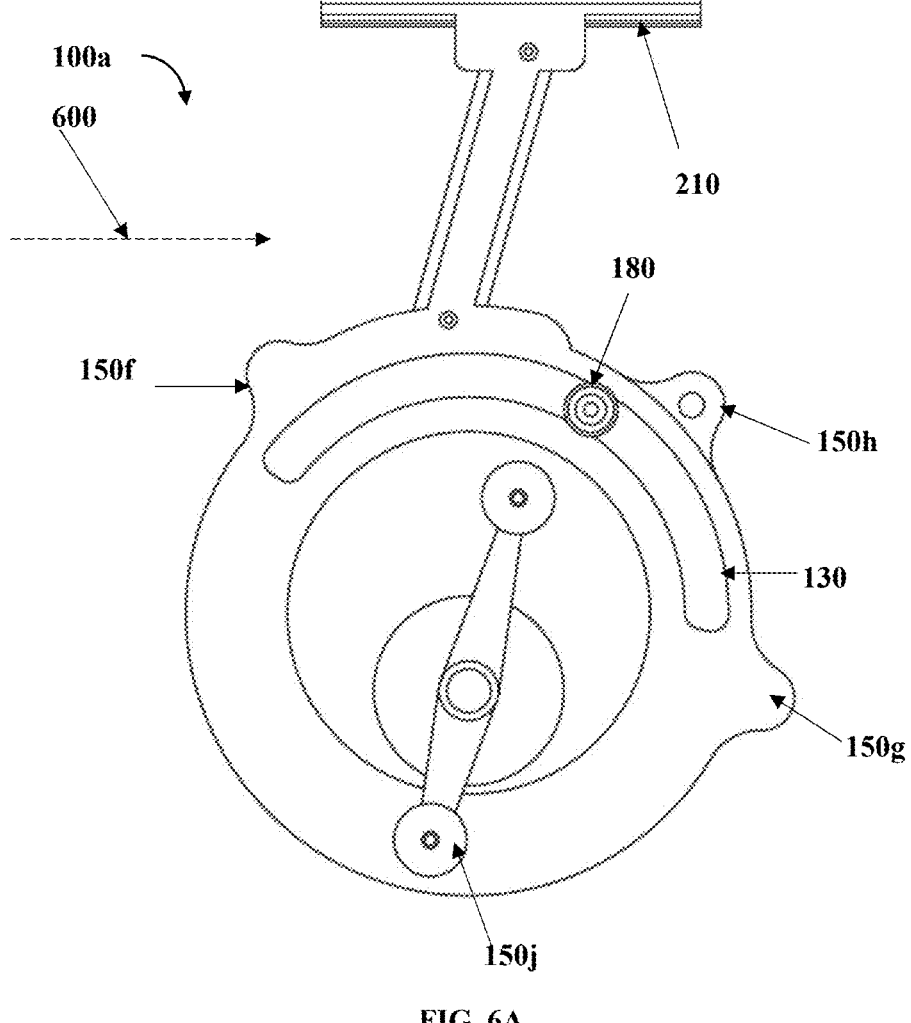
FIG. 6A illustrates a left-side view of the fishing reel showing the lever positioned halfway between the first end a second end of the slot.
Figure 6B:
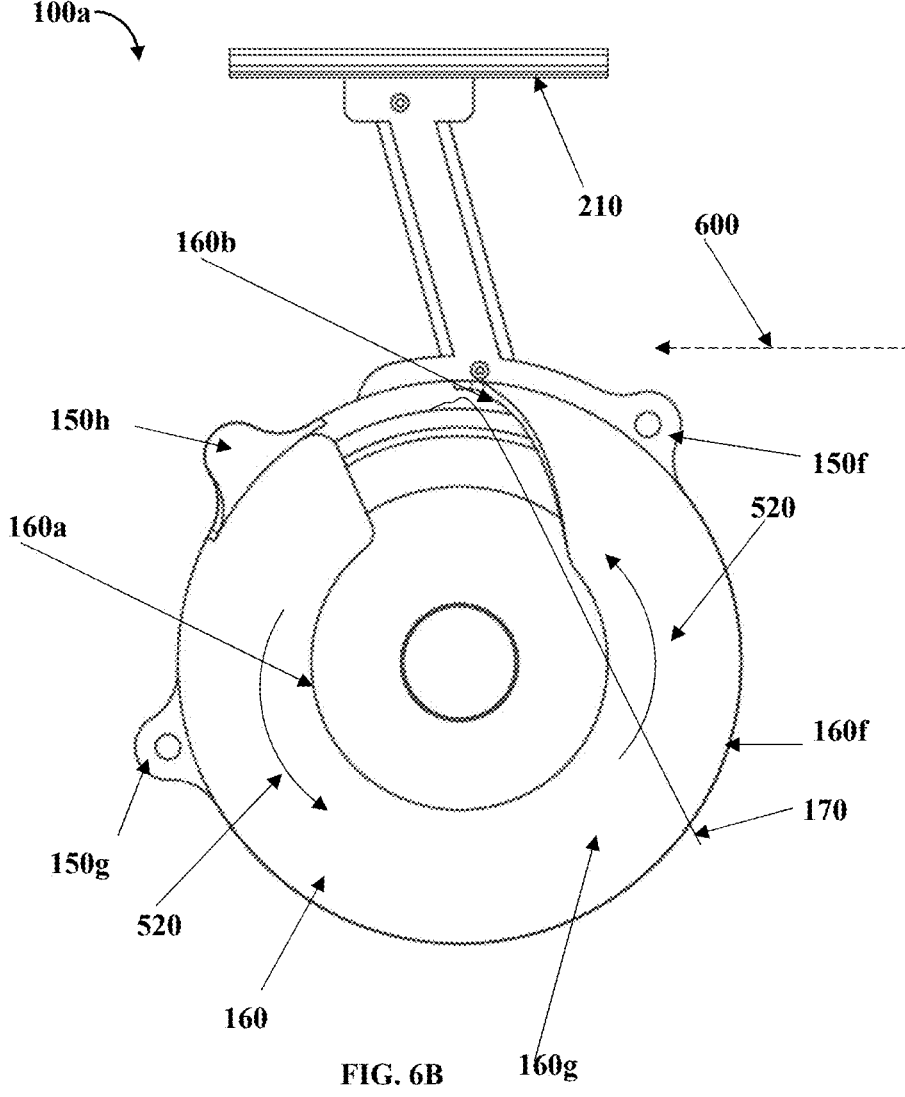
FIG. 6B illustrates a right-side view of the fishing reel showing the position of the rotatable line transfer member when the lever is positioned halfway between the first end and the second end of the slot.
Figure 7A:
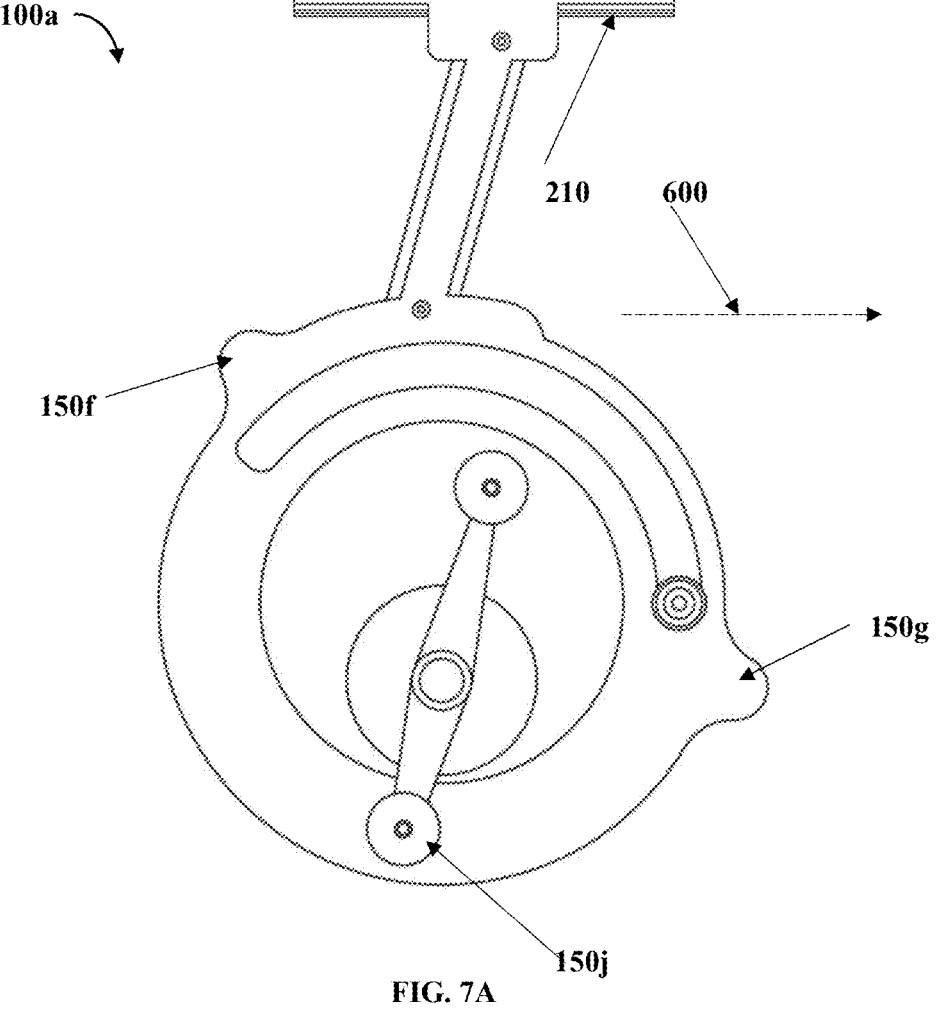
FIG. 7A illustrates a left-side view of the fishing reel showing the lever positioned in second end of the slot.
Figure 7B:
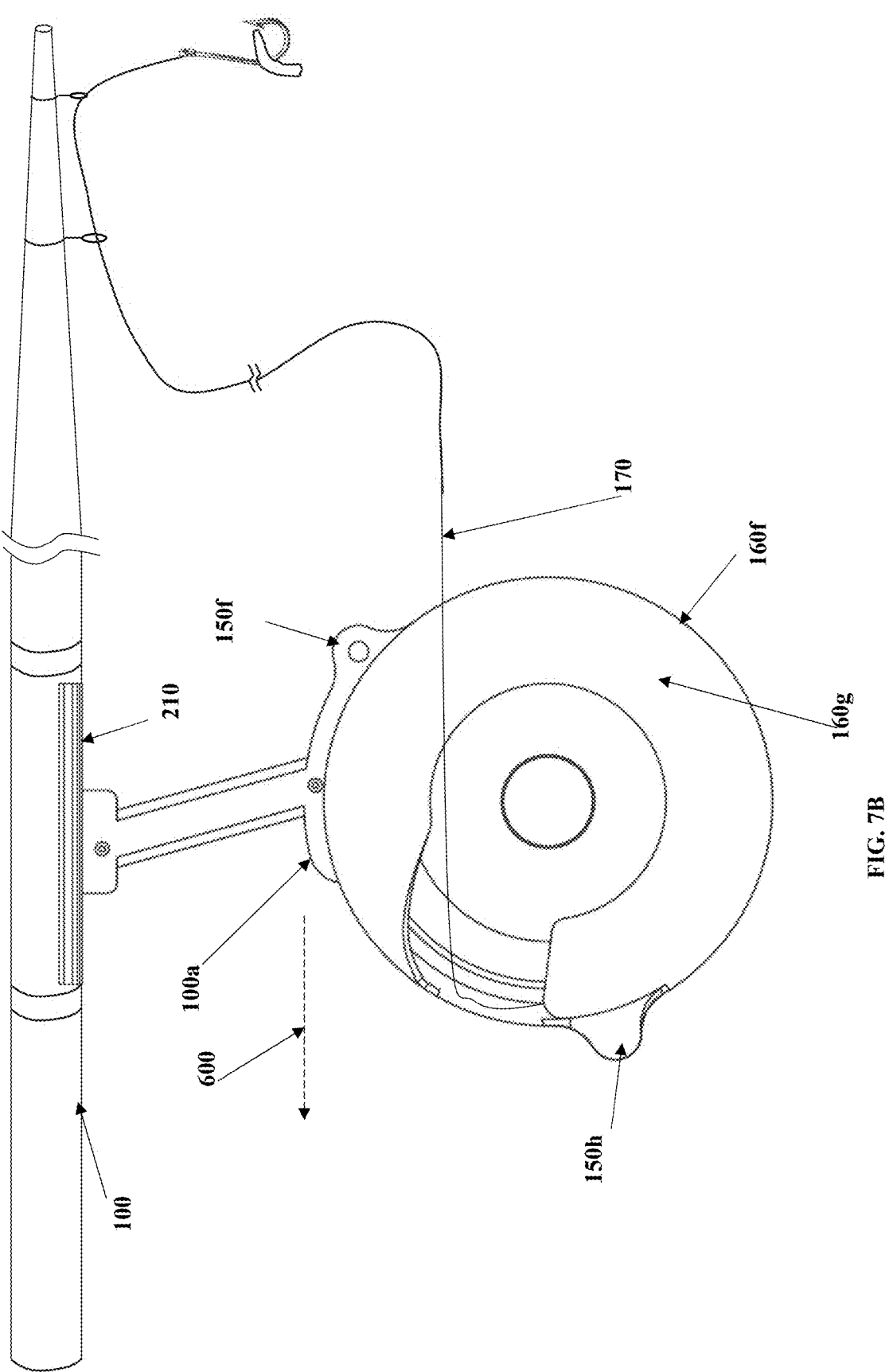
FIG. 7B illustrates a right-side view of the fishing reel showing the rotatable line transfer member in the cast position when the lever is positioned in the second end of the slot to engage a first magnetic stop with a third magnetic stop.

FIG. 6A illustrates a left-side view of the fishing reel 100*a* showing the lever 180 slidably moved and positioned about halfway between the first end 130*a* a second end 130*b* of the slot 130 along the second direction 600. FIG. 6B illustrates a right-side view of the fishing reel 100*a* showing the position of the rotatable line transfer member when the lever 180 is positioned about halfway between the first end 130*a* and the second end 130*b* of the slot 130. FIG. 6B illustrates the same position as FIG. 6A from the other side of the fishing reel 100*a*. FIG. 7A illustrates a left-side view of the fishing reel 100*a* showing the lever 180 positioned in second end 130*b* of the slot 130. As shown in FIG. 7A, the lever 180 position in the second end 130*b* of the slot 130 shows the casting position of the rotatable line transfer member 160. FIG. 7B illustrates a right-side view of the fishing reel 100*a* showing the rotatable line transfer member 160 in the cast position when the lever 180 is positioned in the second end 130*b* of the slot 130 to engage a first magnetic stop 150*h* with a third magnetic stop 150*g*. FIG. 7B illustrates the same position as FIG. 7A but presents a different view from the other side of the fishing reel 100*a*.

In an embodiment, as shown in FIG. 5B, the rotatable line transfer member 160 is rotated in a clockwise direction 510 about the axis of rotation of the spool 140 to position the fishing line 170 in the line slot 160*b* during the retrieve mode. In an embodiment, as shown in FIGS. 6B and 6C, the rotatable line transfer member 160 is rotated in a counter-clockwise direction 520 about the axis of rotation of the spool 140 to position the fishing line 170 in the truncated, cut-off top 160*a* of the dome-shaped body 160*g* of the rotatable line transfer member 160 during the cast mode.

As illustrated in FIGS. 1A-4 and 5A-7B, the perimeter 160*f* of the dome-shaped body 160*g* of the rotatable line-transfer member 160 comprises a first magnetic stop 150*h*. The first magnetic stop 150*h* is positioned adjacent to the circumferential segment 160*h* of the reel body 160*h*, as shown in FIGS. 3, 4, and 5B. The perimeter 150*e* of the reel body 150 comprises a second magnetic stop 150*f* adjacent to the first end 130*a* of the slot 130 and a third magnetic stop 150*g* adjacent to the second end 130*b* of the slot 130. The second magnetic stop 150*f* and the third magnetic stop 150*g* are configured to releasably retain the line-transfer member 160 in the retrieve and cast positions when the first magnetic stop 150*h* engages with the second magnetic stop 150*f* and the third magnetic stop 150*g* respectively. The second magnetic stop 150*f* or the third magnetic stop 150*g* engage with the first magnetic stop 150*h* to maintain the rotatable line transfer member 160 in an assigned position until the rotatable line transfer member 160 is manually moved. The truncated top 160*a* and the line slot 160*b* of the rotatable line transfer member 160 are configured to receive and pass the fishing line 170 from and to the spool 140 of the fishing reel 100*a*. This occurs when the rotatable line transfer member 160 is rotated causing the first magnetic stop 150*h* to engage with the second magnetic stop 150*f* which causes the fishing line 170 to travel to the cast position. When the rotatable line transfer member 160 is rotated in the opposite direction, the first magnetic stop 150*h* engages with the third magnetic stop 150*g* which causes the fishing line 170 to travel to the retrieve position. The fishing line 170 travels in the line slot 160*b* up when rotated to the cast position, and down the line slot 160*b* when rotated to the retrieve position.

An alternative to the disclosed magnetic stops may also be used, such as a mechanical clip, a detent, etc. The detent, for example, a ball and spring detent of a spring-loaded translational detent mechanism holds the rotatable line transfer member 160 in place while it's at each stop. The spring-loaded translational detent block may be positioned in place of the first magnetic stop 150*h*. The second magnetic stop 150*f* may be replaced by a first conical notch and the third magnetic stop 150*g* may be replaced by a second conical notch. The ball of the spring-loaded translational. detent slides horizontally over the reel body 150 until the ball encounters either the first conical notch or the second conical notch at which point the ball is pushed into the first conical notch or the second conical notch, locking the rotatable line transfer member 160 in place until the rotatable line transfer member 160 is manually moved by application of a light force by the angler.

The advantages of the fishing reel with a lever actuated rotatable line transfer member are as follows:

Intuitive control: The lever 180 provides a simple and intuitive method for controlling the rotation of the line transfer member 160.

Ergonomic design: The lever 180 slidably passing through the reel body 150 via the slot 130 in the reel body 150 allows for comfortable operation with minimal hand movement, and.

Enhanced functionality: The lever actuation system offers precise control over the line transfer member 160, ensuring smooth transitions between casting and retrieving.

Figure 8A:
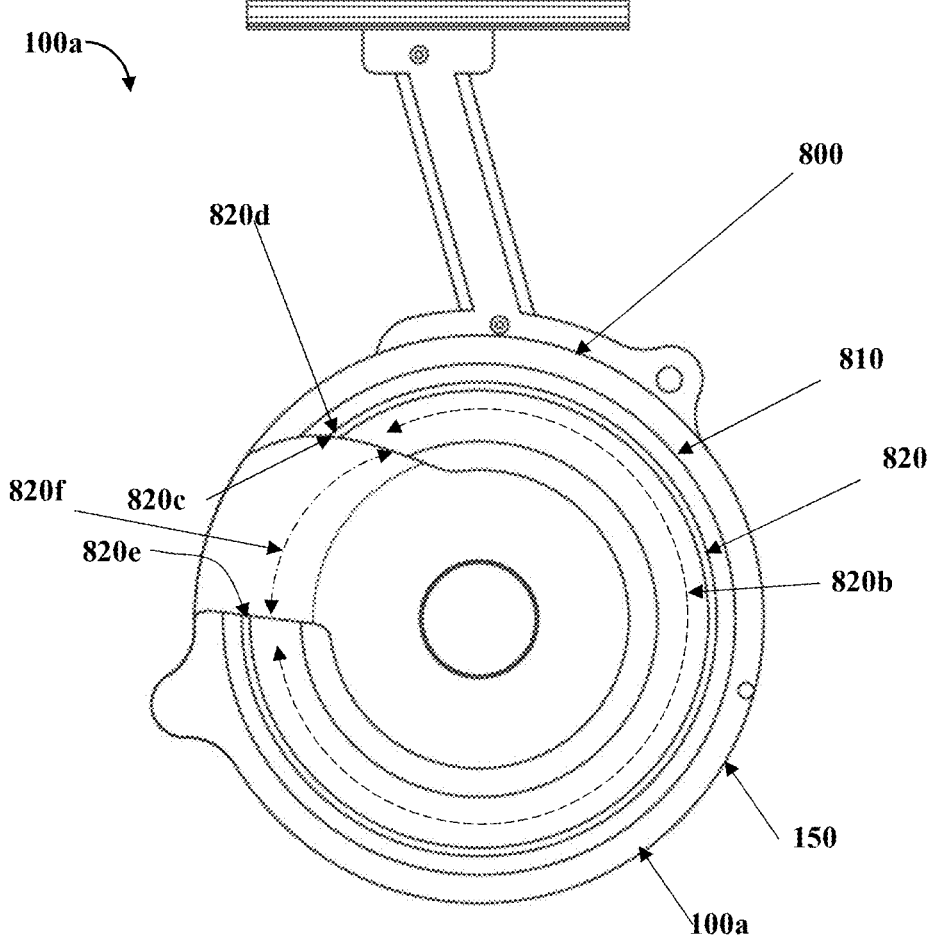
FIG. 8A illustrates a right-side view of a fishing reel showing a first embodiment of a wire-frame based rotatable line transfer member in a cast position.
Figure 8B:
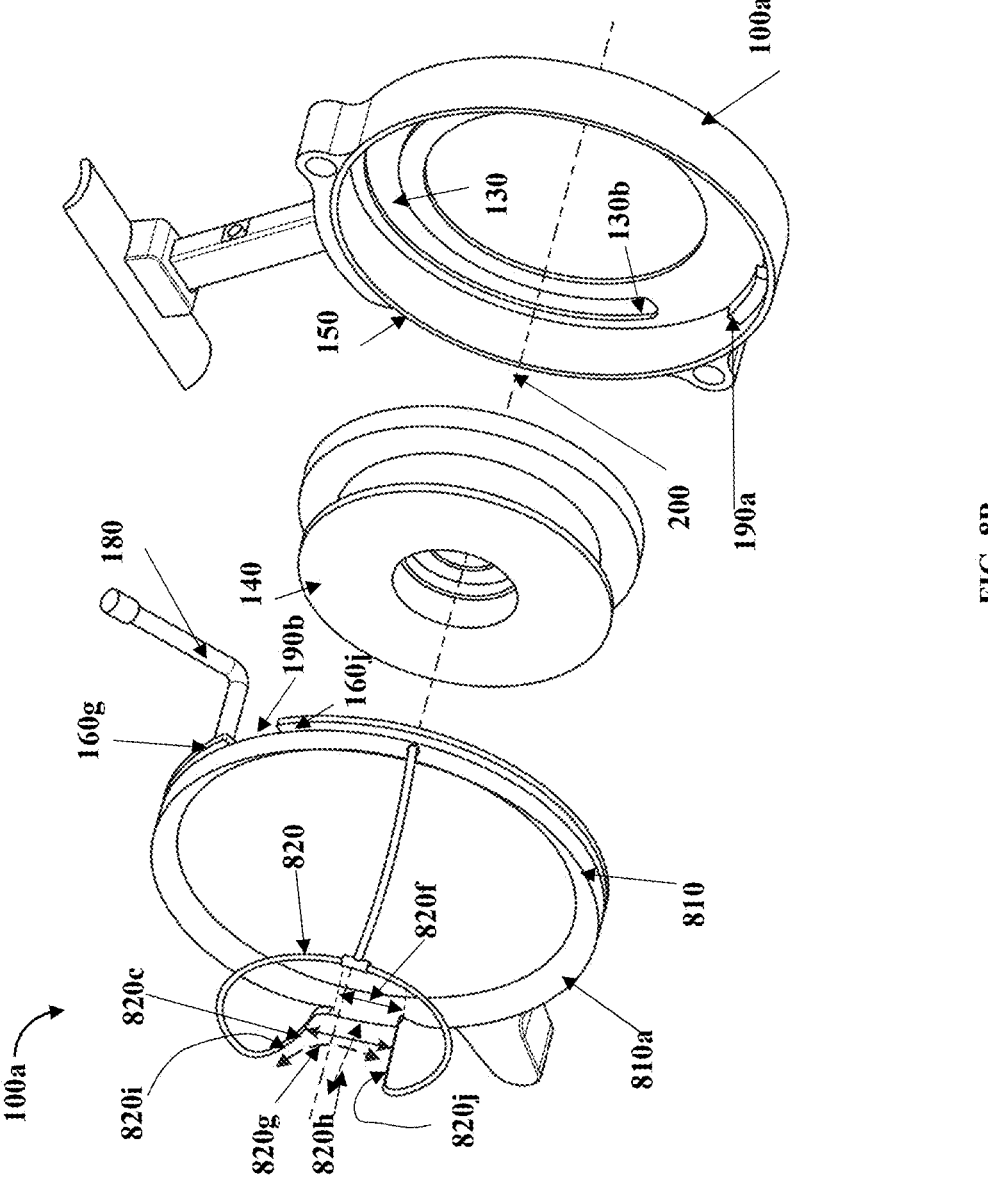
FIG. 8B illustrates an exploded view of the fishing reel showing the first embodiment of a wire-frame based rotatable line transfer member of the fishing reel shown in FIG. 8A.

FIG. 8A illustrates a right-side view of a fishing reel 100*a* showing a first embodiment of a wire-frame based rotatable line transfer member 800 in a cast position. FIG. 8B illustrates an exploded view of the fishing reel 100*a* showing the first embodiment of the wire-frame based rotatable line transfer member 800 of the fishing reel 100*a* shown in FIG. 8A. As illustrated in FIGS. 8A and 8B, the fishing reel 100*a* comprises a reel body 150, a spool 140 mounted on the reel body 150 with a central axis 200. The rotatable line transfer member 800 is mounted to the reel body 150 for rotation about the central axis 200 between (i) a retrieve position in which a line slot 820*c* of the rotatable line-transfer member 800 guides a fishing line 170 during retrieval and (ii) a cast position in which the fishing line 170 is permitted to payout from the spool 140.

As illustrated in FIGS. 8A-8B, the rotatable line transfer member 800 comprises a circular base 810 and a wire-frame 820 projecting above and substantially spanning across a diameter of the circular base 810. The wire frame 820 defines the shape of a major circular sector 820*b* that is disposed above the circular base 810 on a horizontal plane. The line slot 820*c* attaches the wire frame 820 to the circular base 810. The line slot 820*c* of the wire frame 820 comprises an L-shaped channel 820*g* having a radial segment 820*h* and a circumferential segment 820*f*. As shown in FIGS. 8A and 8F, the radial segment 820*h* extends between the circumferential segment 820*f* of the L-shaped channel 820*g* and an opening 820*f* in the wire frame 820 that is between ends 820*d* and 820*e* of the major circular sector 820*b* of the wire frame 820, as shown in FIG. 8A. The circumferential segment 820*f* is adjacent to the perimeter 810*a* of the base 810 of the rotatable line-transfer member 800. The line slot 820*c* is configured to receive and pass a fishing line 170 from and to the spool 140 of the fishing reel 100*a*. The spool 140 is disposed below the rotatable line transfer member 800.

In an embodiment, the rotatable line transfer member 800 shown in FIGS. 8A and 8B further comprises a lever 180 extending through a slot 130 in the reel body 150 and operatively coupled to the line-transfer member 800, similar to the lever 180 shown in FIGS. 3-5A. The lever 180 is slidable between a first end 130*a* and a second end (not shown) of the slot 130 to rotate the rotatable line-transfer member 800 to the retrieve position and the cast position respectively.

Figure 9A:
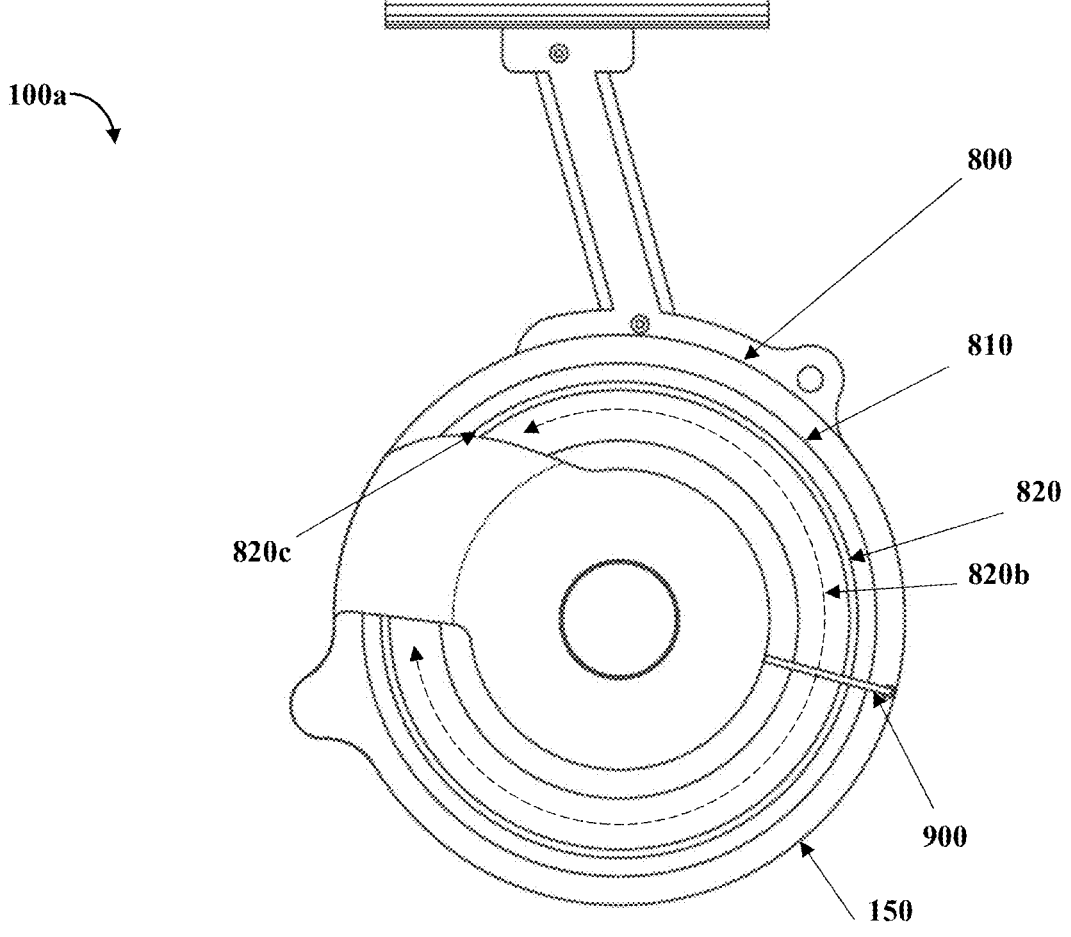
FIG. 9A illustrates a right-side view of a fishing reel showing a second embodiment of a wire-frame based rotatable line transfer member.
Figure 9B:
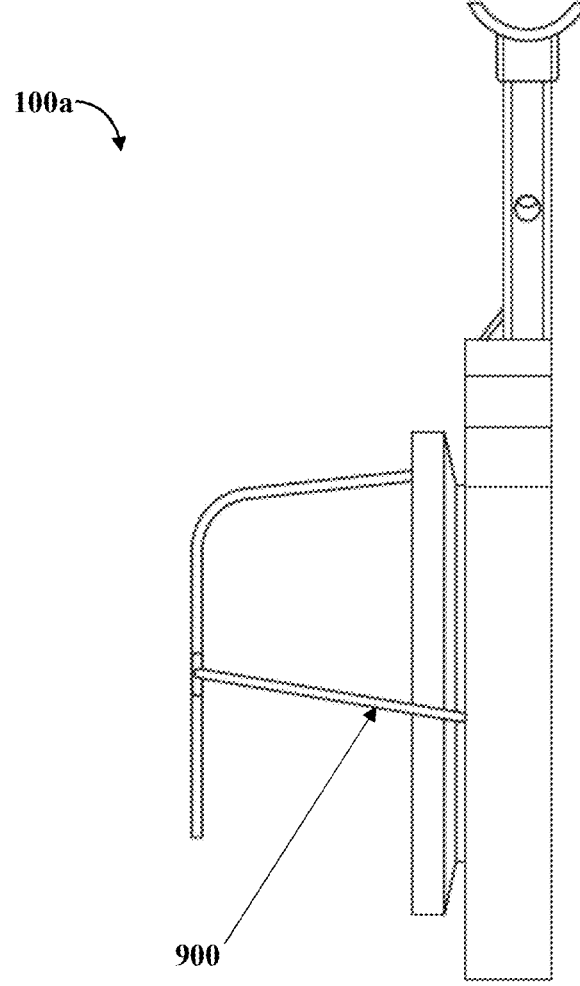
FIG. 9B illustrates a front view of the second embodiment of a wire-frame based rotatable line transfer member.
Figure 9C:
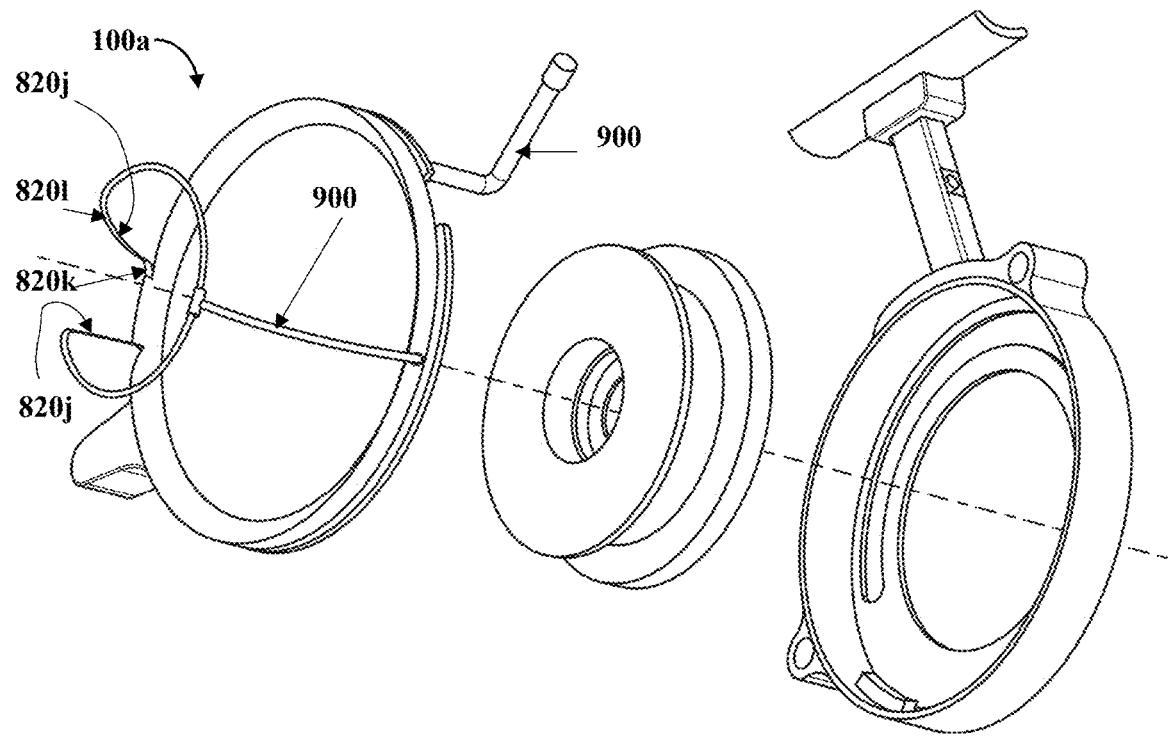
FIG. 9C illustrates an exploded view of the fishing reel showing the second embodiment of a wire-frame based rotatable line transfer member.

FIGS. 9A-9C is similar to the embodiment shown in FIGS. 8A-8B, except for a support arm 900 extending from the wire frame 820 defining the shape of the major circular sector. FIG. 9A illustrates a right-side view of a fishing reel 100*a* showing a second embodiment of a wire-frame 820 based rotatable line transfer member 800. FIG. 9B illustrates a front view of the second embodiment of a wire-frame 820 based rotatable line transfer member 800. FIG. 9C illustrates an exploded view of the fishing reel 100*a* showing the second embodiment of a wire-frame 820 based rotatable line transfer member 800.

As shown in FIGS. 8A-9C, the line slot 820*c* is wire formed, creating the same curvature and dimensions of the line slot 820*c* for the fishing line 170 to be directed to the retrieve and casting positions by rotation to each position. This embodiment would be open as compared to the previous dome-shaped body 160*g* embodiment which is a rotating enclosure with a line slot. In another embodiment, sides 820*i* and 820*j* of the line slot 820*c* are non-linear, as shown in FIGS. 8B and 9C. The sides 820*i* and 820*j* are curved or rounded-off at corners 820*k* and edges 8201 in the line slot 820*c* to enable smooth flow of the fishing line 170 in the line slot 820*c* during transitions between casting and retrieving. In another embodiment, sides 820*i* and 820*j* of the line slot 820*c* are substantially linear.

Figure 10A:
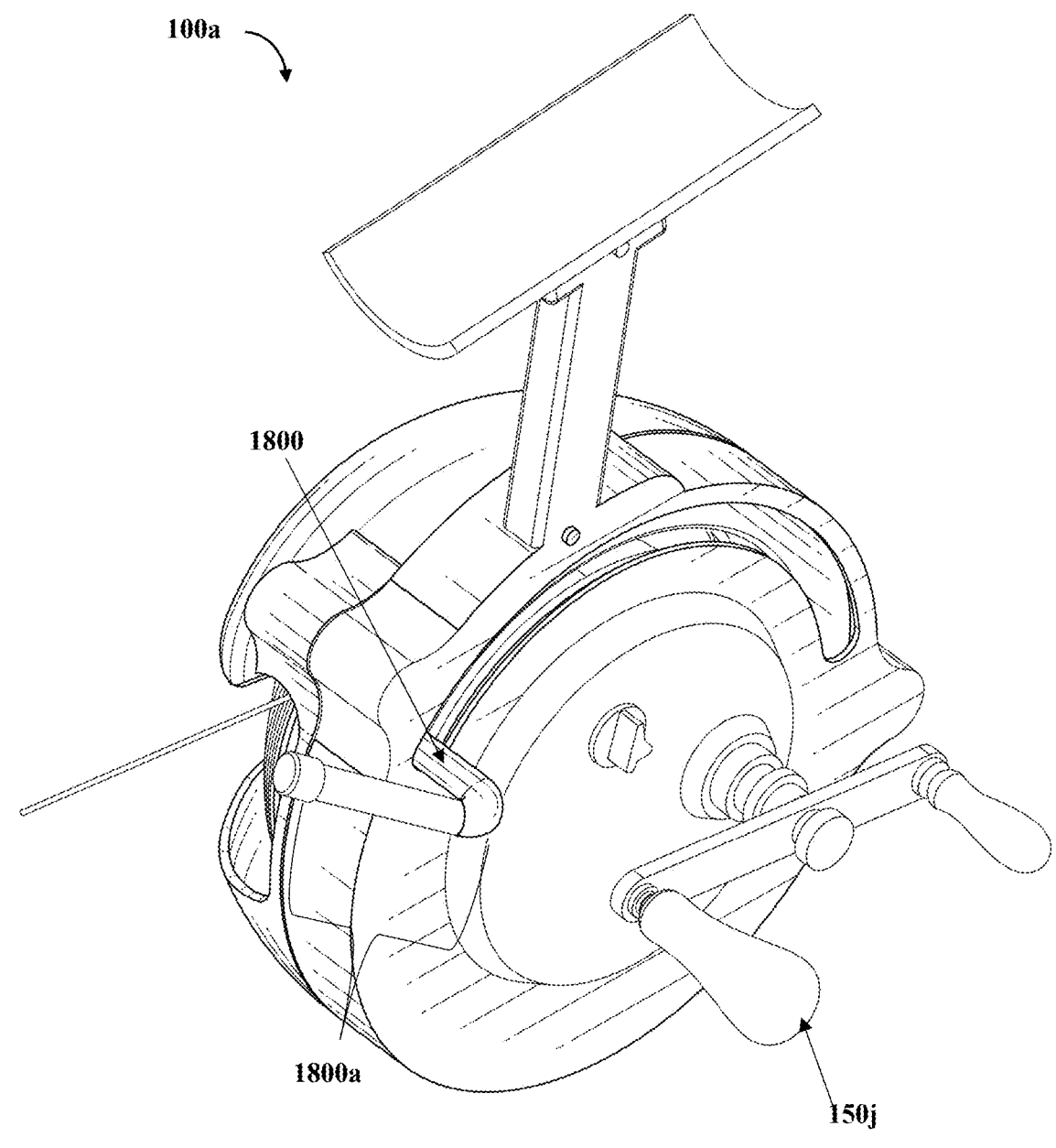
FIGS. 10A-10G illustrate an embodiment of the rotatable line transfer member comprising an angled lever.
Figure 10B:
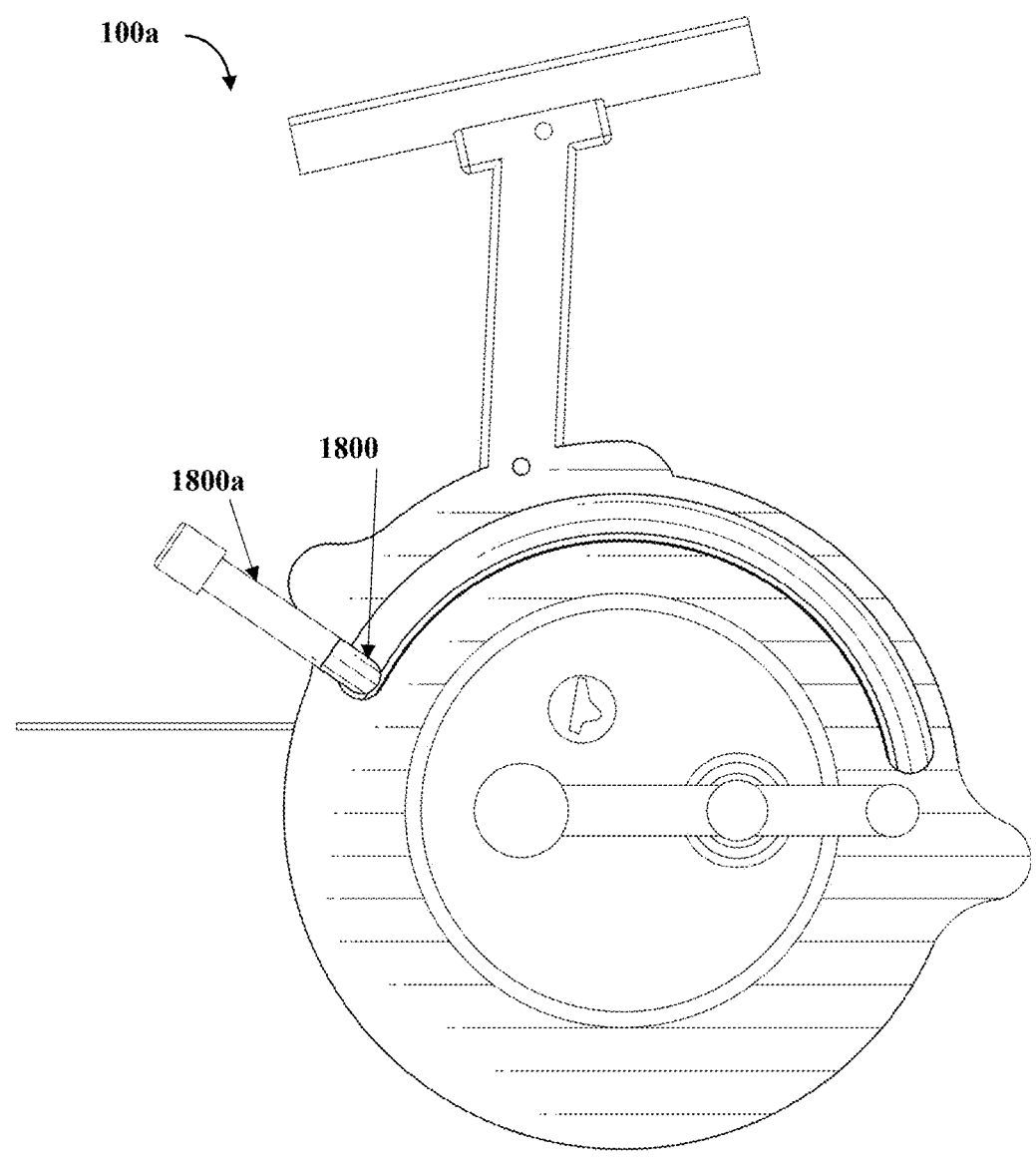
Figure 10C:
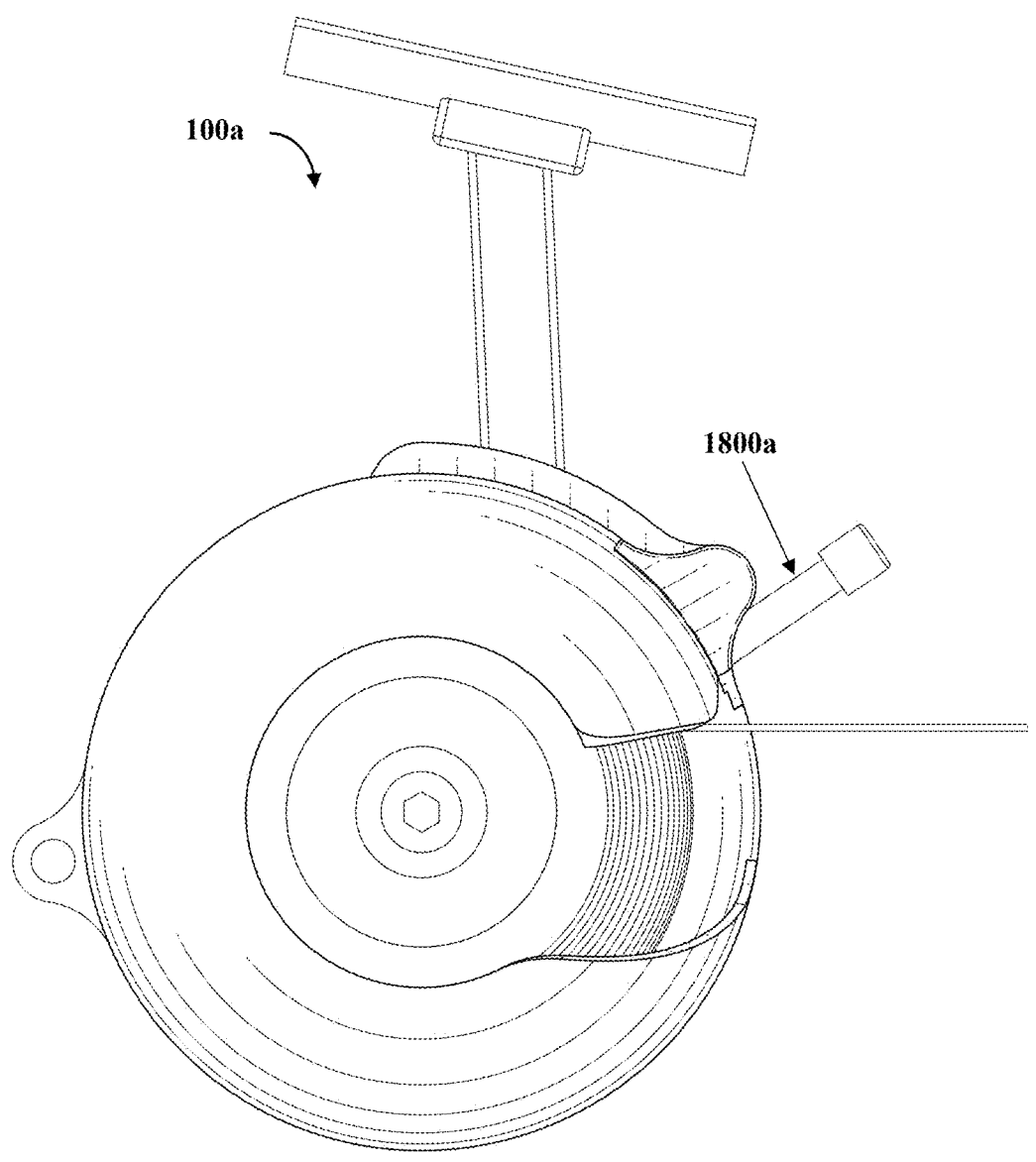
Figure 10D:
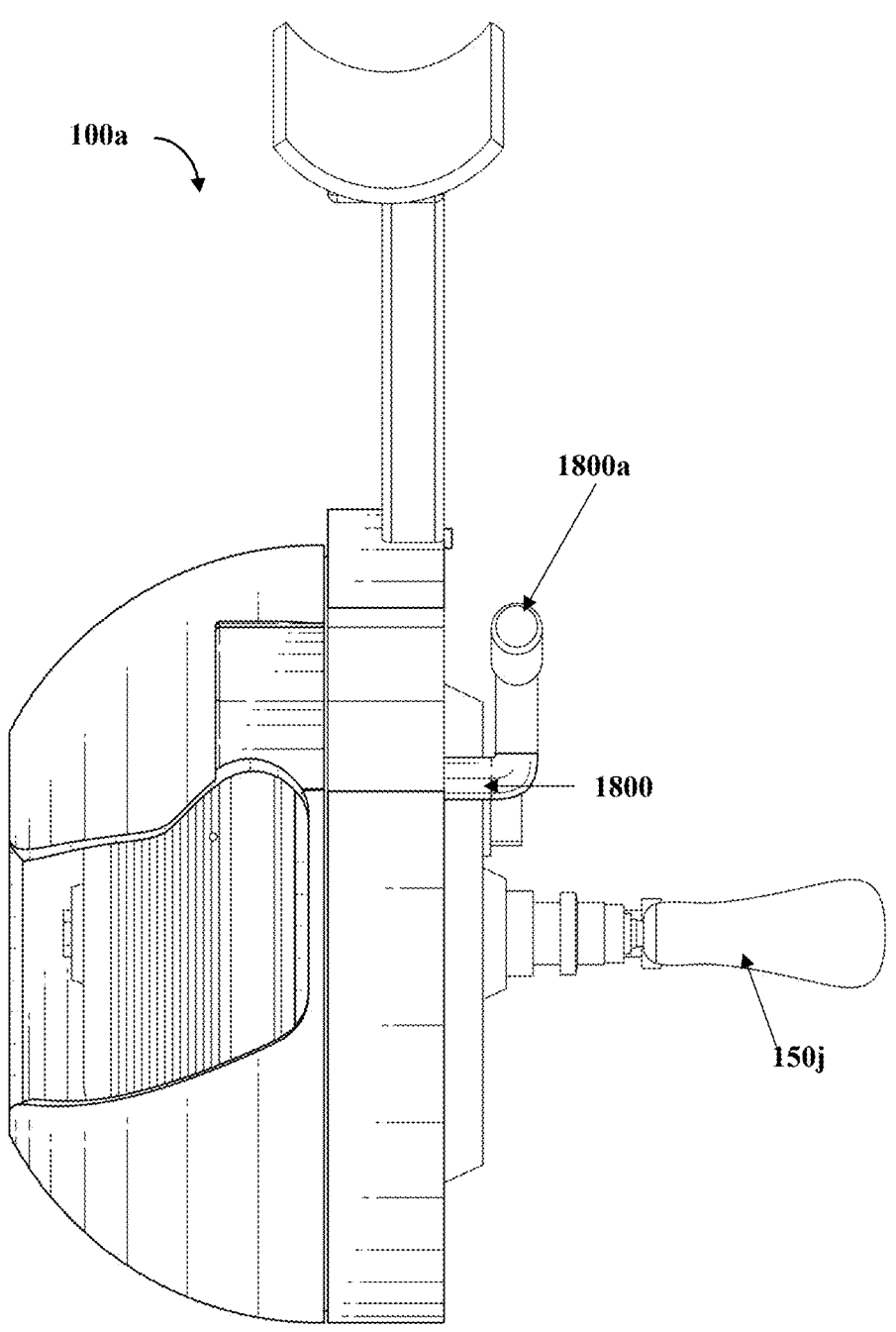
Figure 10E:
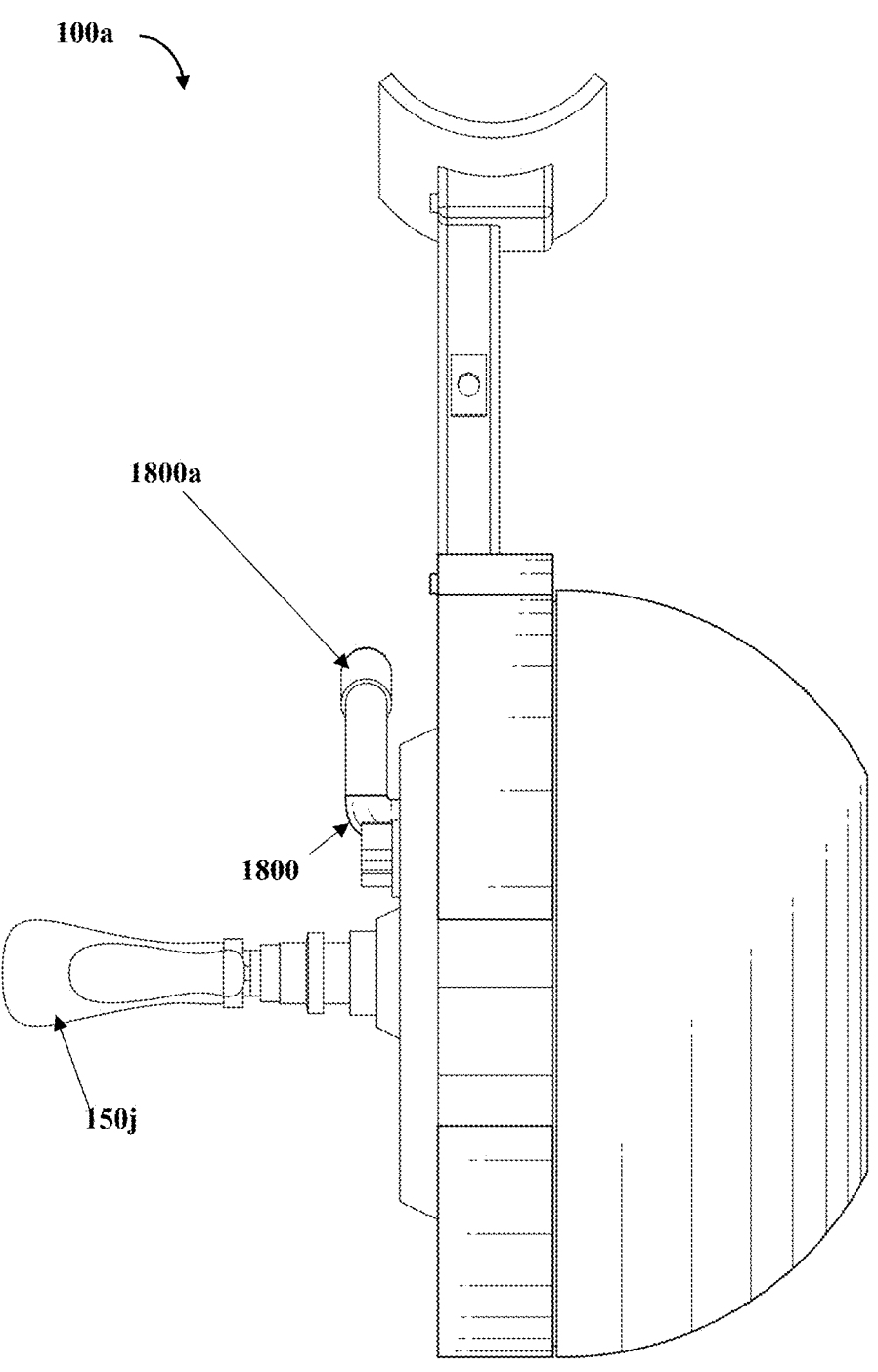
Figure 10F:
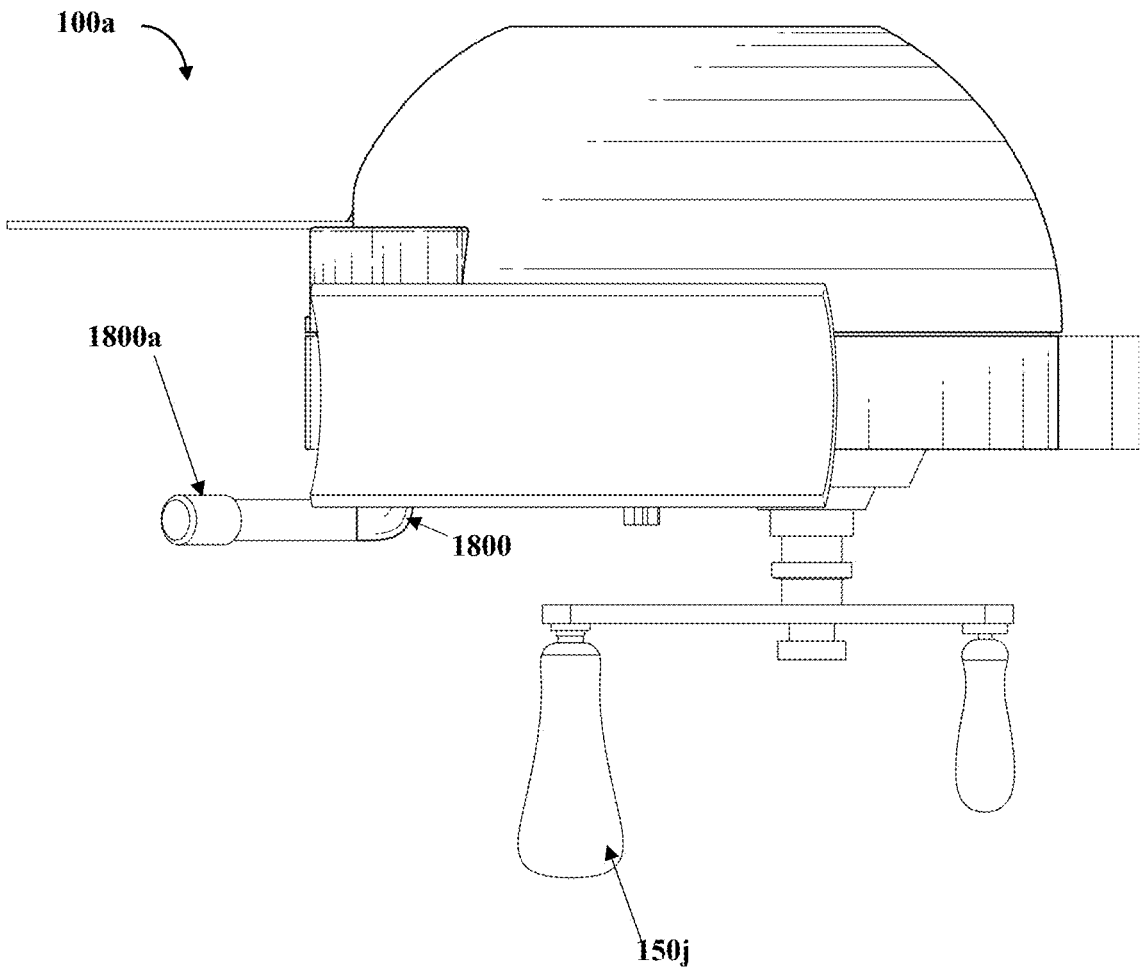
Figure 10G:
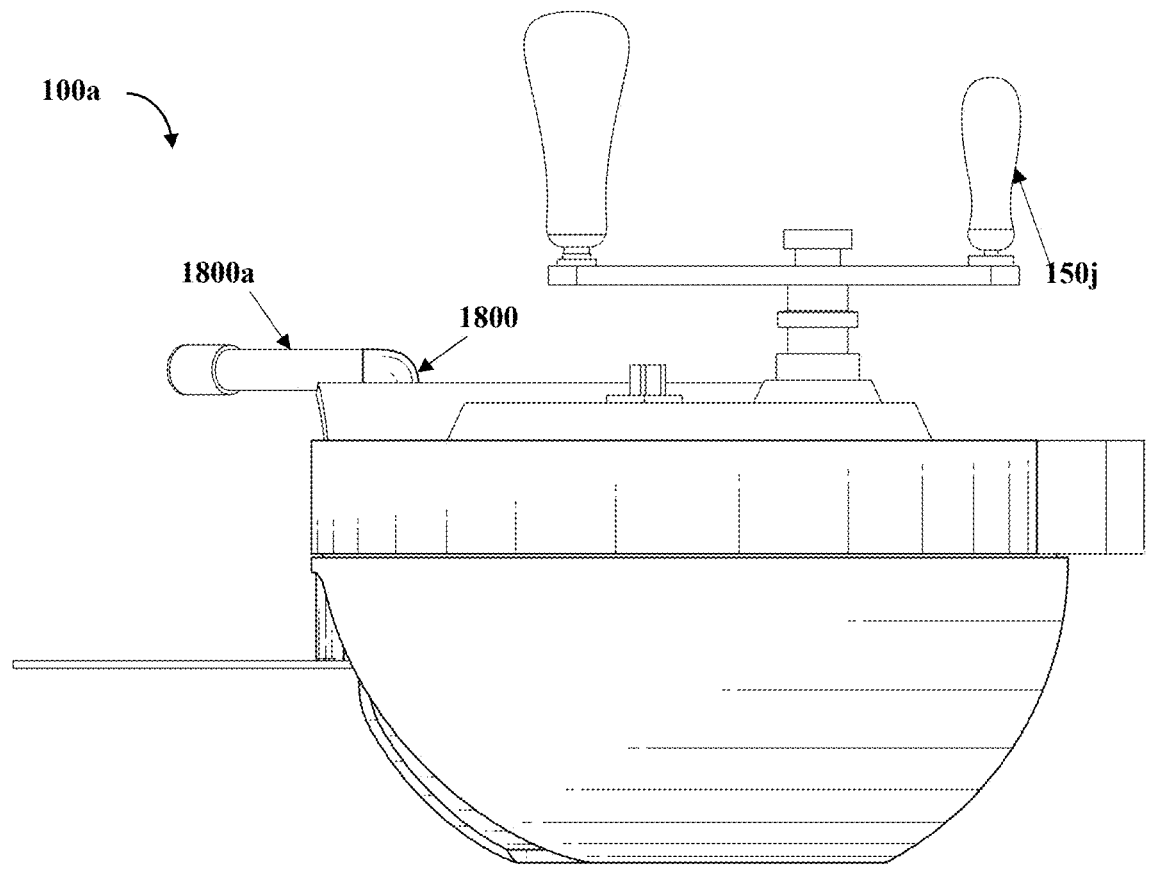

FIGS. 10A-10G illustrate an embodiment of the rotatable line transfer member 160 where the lever 1800 comprises a bent extension 1800*a*. As illustrated in FIG. 10A, the lever 1800 has a bent extension 1800*a* compared to the lever 180 shown in FIGS. 1A-7B. The bent extension 1800*a* is bent at an angle of about 90 degrees for ease of access by the user. In an embodiment, the bent extension 1800*a* that extends from the lever 1800 is bent at an obtuse angle with respect to the lever 1800.

As illustrated in FIGS. 2B and 8B, the reel body 150 and rotatable line transfer member 160 are usually attached by means of one part having a tab 190*a* and the other having a slot 190*b* for the tab 190*a* to be inserted into the slot 190*b* and allow the tab 190*a* to travel and rotate within a groove 160*j* of a grooved lower perimeter 160*g* of the rotatable line transfer member 160. As illustrated in FIG. 2B, the generally cylindrical receptacle 150*a* of the reel body 150 is recessed or hollow within the generally cylindrical wall 150*b*. The inner perimeter 150*k* of the generally cylindrical wall 150*b* comprises a tab 190*a* attached to the inner perimeter 150*k* of the generally cylindrical wall 150*b*. The tab 190*a* is distanced from the flat annular base 150*c* such that there is a gap between the flat annular base 150*c* and the tab 190*a*. In an embodiment, the tab 190*a* is located approximately at a mid-section of the height of the generally cylindrical wall 150*b*. The rotatable line transfer member 160 further comprises a slot 190*b* cut into the grooved lower perimeter 160*g* of the rotatable line transfer member 160. To rotatably attach the rotatable line transfer member 160 to the generally cylindrical receptacle 150*a* of the reel body 150, the rotatable line transfer member 160 is positioned over the generally cylindrical receptacle 150*a* of the reel body 150 such that the tab 190*a* of the rotatable line transfer member 160 aligns with the slot 190*b* of the generally cylindrical receptacle 150*a*. The rotatable line transfer member 160 is then mated with the generally cylindrical receptacle 150*a* of the reel body 150 such that the tab 190*a* passes through the slot 190*b* and into a portion of the grooved lower perimeter 160*g* directly adjacent to the slot 190*b*. The rotatable line transfer member 160 is then rotated which causes the tab 190*a* to move into a portion of the grooved lower perimeter 160*g* which is away from the slot 190*b*. The tab 190*a* then functions to rotatably retain the rotatable line transfer member 160 and the cylindrical receptacle 150*a* of the reel body 150. The tab 190*a* rotates within the grooved lower perimeter 160*g* of the generally cylindrical receptacle 150*a* of the reel body 150 when the rotatable line transfer member 160 is rotated.

As illustrated in FIGS. 2B and 8B, the tab 190*a* and the slot 190*b* together form the securing mechanism 190 to rotatably secure the line transfer member 160 to the reel body 150. In an embodiment, the tab 190*a* on the reel body 150 may be fractionally larger than the slot 190*b* such that the tab 190*a* does not slidably fit into the slot 190*b* when the tab 190*a* of the rotatable line transfer member 160 is aligned with the slot 190*b* of the generally cylindrical receptacle

150*a*. Instead, the rotatable line transfer member 160 needs to be pushed into the cylindrical receptacle 150*a* by applying a force to create a rotatable connection between the rotatable line transfer member 160 and the cylindrical receptacle 150*a* that can be easily assembled and disassembled with a slight push or pull. The reel body 150 and rotatable line transfer member 160 rotate while attached with each other traveling from the second magnetic stop 150*f* to the third magnetic stop 150*g* and vice-versa when the angler desires to travel to the position of the desired one of the second magnetic stop 150*f* and the third magnetic stop 150*g*. While traveling this path from the second magnetic stop 150*f* to the third magnetic stop 150*g* and vice-versa, the two parts i.e., the reel body 150 and rotatable line transfer member 160 are designed so that the tab 190*a* and the slot 190*b* do not come into alignment. If the reel body 150 and rotatable line transfer member 160 were to align during this movement, the reel body 150 and rotatable line transfer member 160 parts may separate from each other.

Figure 11:
FIG. 11 illustrates an exploded view of an embodiment of the fishing reel having an extended slot.
Figure 12A:
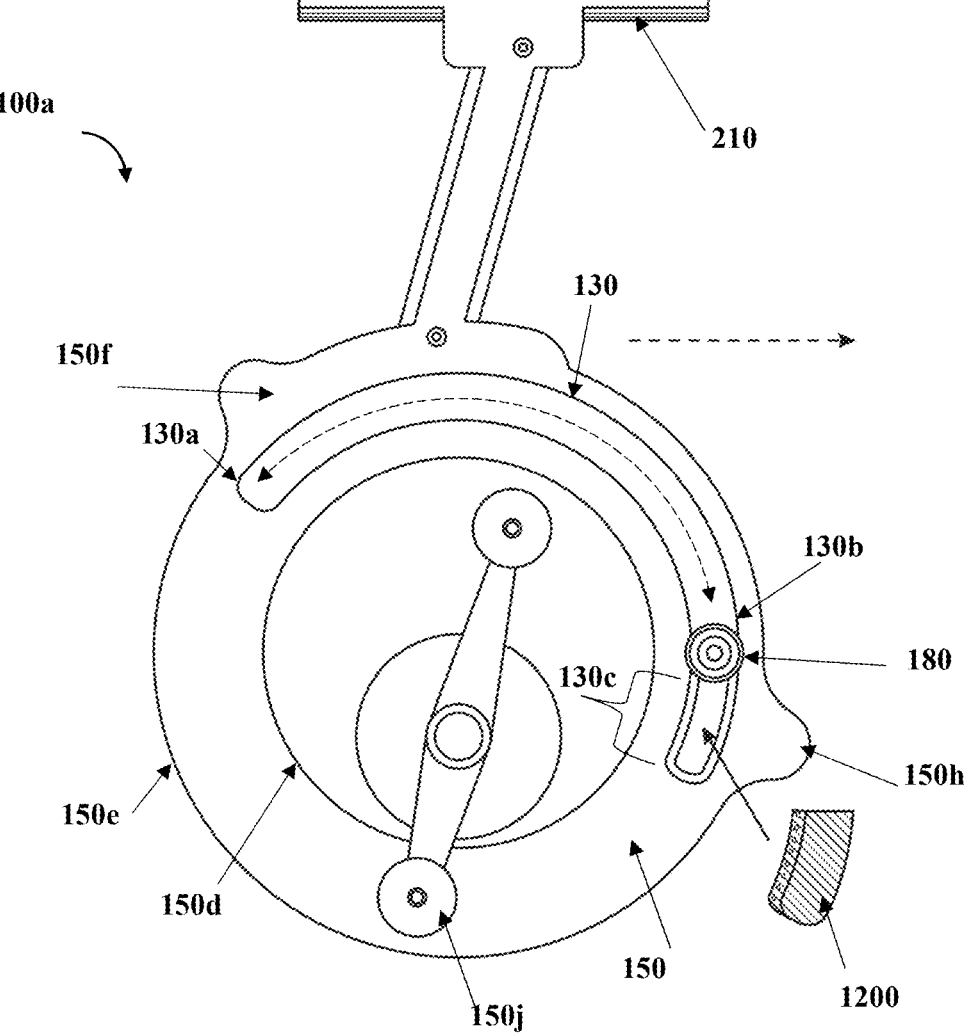
FIG. 12A illustrates a left-side view of the embodiment of the fishing reel having an extended slot.

Unless the tab 190*a* and the slot 190*b* align, the rotatable line transfer member 160 cannot be separated from the reel body 150. The rotatable line transfer member 160 may occasionally need to be separated from the reel body 150 to access the spool 140 that carries the fishing line 170 which is located below the rotatable line transfer member 160. Accordingly, the slot 130 is made longer at the second end 130*b* to allow the lever 180 to go past the second end 130*b* and stop at a position that will allow the tab 190*a* and the slot 190*b* to align so that the angler may remove the rotatable line transfer member 160. FIG. 11 illustrates an exploded view of an embodiment of the fishing reel 100*a* having an extended slot 130*c* which extends beyond the second end 130*b* of the slot 130. FIG. 12A illustrates a left-side view of the embodiment of the fishing reel 100*a* having an extended slot 130*c*. The extended slot 130*c* allows the lever 180 go past the second end 130*b* to a position that will allow the tab 190*a* and the slot 190*b* to align so that the angler may separate the rotatable line transfer member 160 from the reel body 150.

In an embodiment, the third magnetic stop 150*g* at the second end 130*b* acts as an integrated safety catch, preventing the rotatable line transfer member 160 from traveling beyond the second end 130*b* to a junction 1100 of the slot 190*b* and the tab 190*a*, and allowing the tab 190*a* and the slot 190*b* to align and thereby allow the angler to separate the rotatable line transfer member 160 from the reel body 150.

Figure 12B:
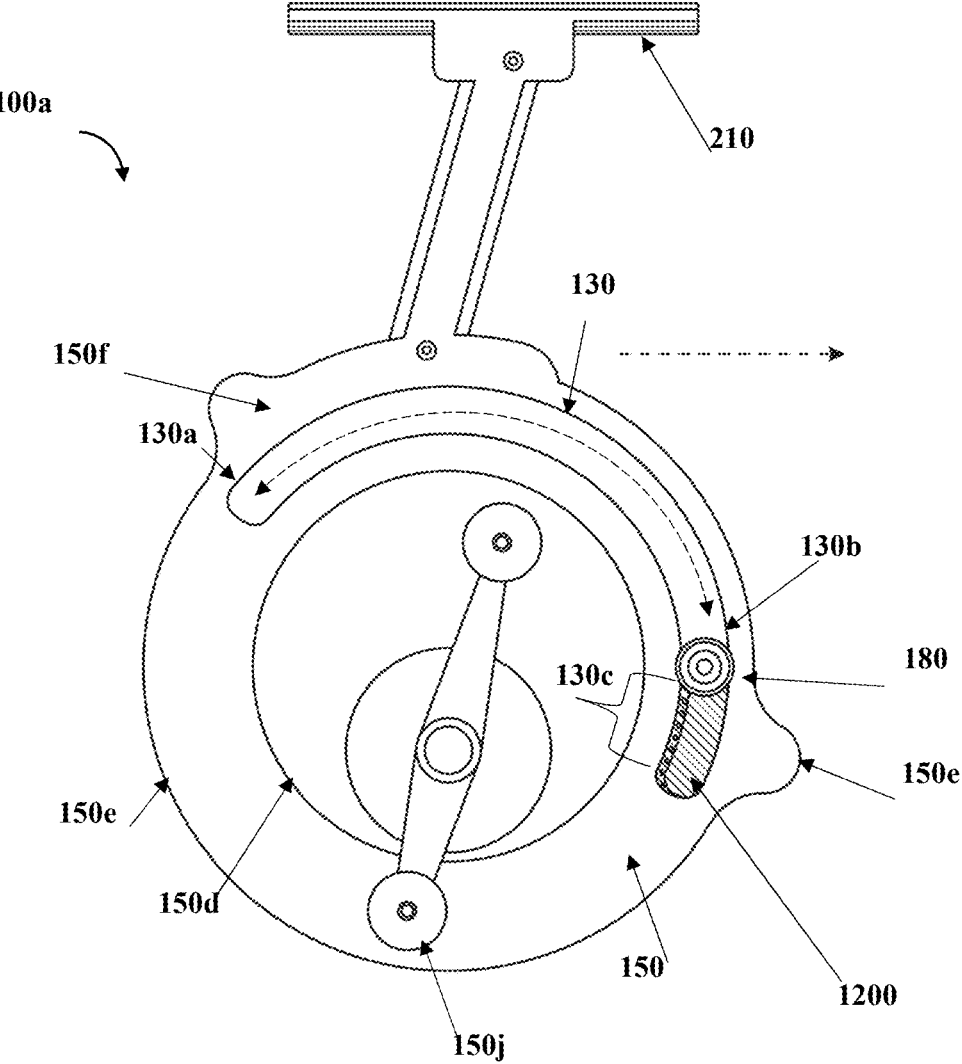
FIG. 12B illustrates a removable safety catch installed in the extended slot.

FIG. 12B illustrates a removable safety catch installed in the extended slot 130*c*. As a safety precaution, to prevent the alignment of the slot 190*b* and the tab 190*a* and separation of the rotatable line transfer member 160 from the reel body 150 at an undesired time while operating the fishing reel 100*a*, the removable safety catch is implemented using a safety block 1200 shown in FIG. 12A. The extended slot 130*c* is configured to accommodate the removable safety catch, for example, the safety block 1200. The safety block 1200 is configured to be inserted into the extended slot 130*c*. The safety block 1200 prevents the lever 180 that is operatively coupled to the rotatable line-transfer member 160 from rotating beyond the cast stop. The safety block 1200 is removable when maintenance requires the rotatable line-transfer member 160 to be separated from the reel body 150.

Figure 13A:
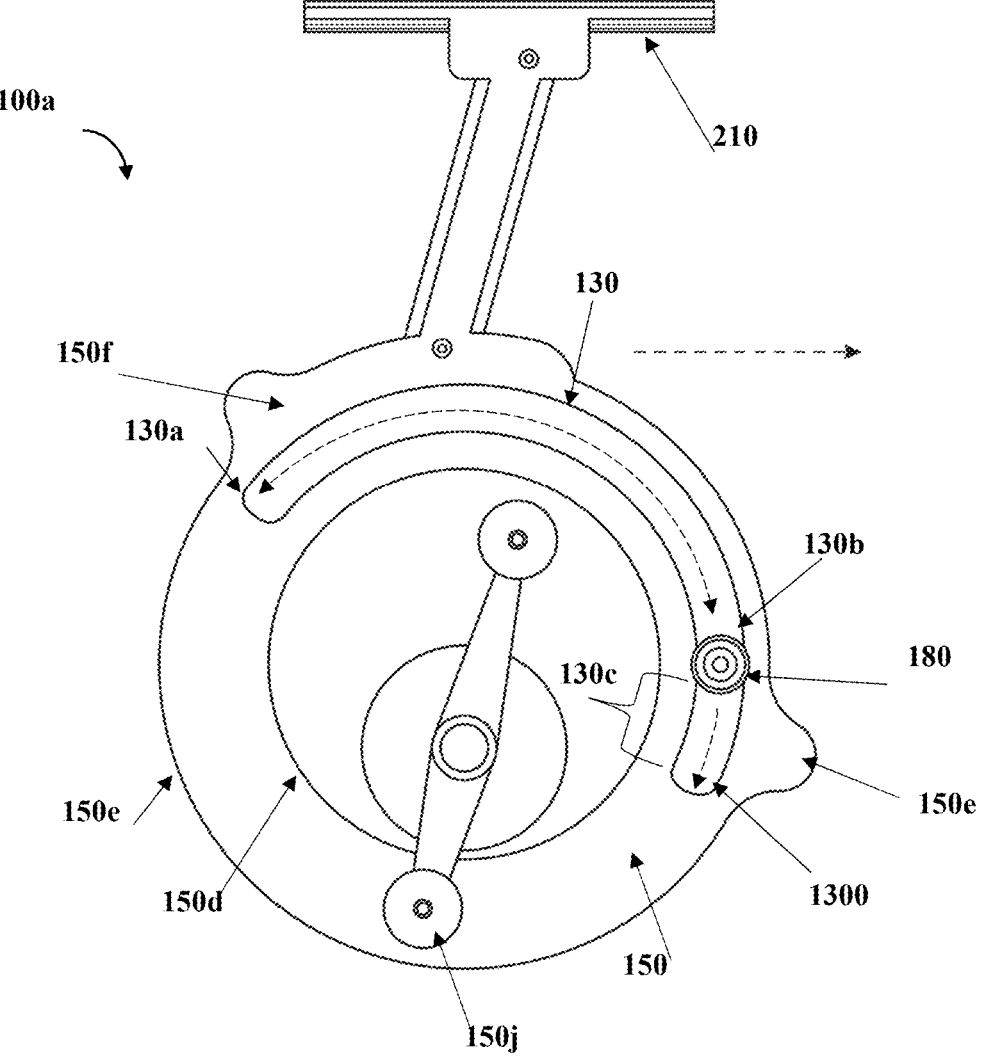
FIG. 13A illustrates a left-side view of the embodiment of the fishing reel with the safety block removed to enable the lever to travel beyond the second end of the slot and into the extended slot.
Figure 13B:
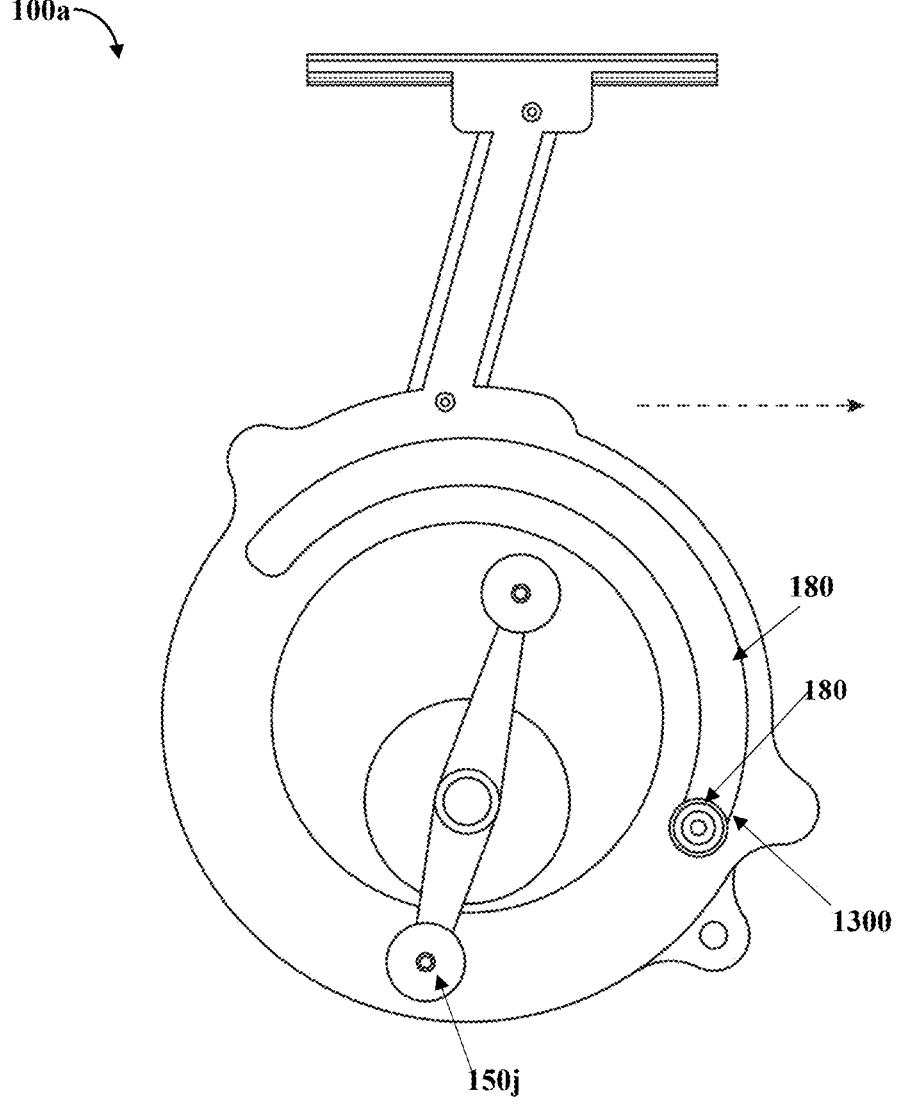
FIG. 13B illustrates a left-side view of the embodiment of the fishing reel with the lever slid towards an end of the extended slot.

FIG. 13A illustrates a left-side view of the embodiment of the fishing reel 100*a* with the safety block 1200 removed to enable the lever 180 to travel beyond the second end 130*b* of the slot 130 and into the extended slot 130*c*. FIG. 13B illustrates a left-side view of the embodiment of the fishing reel 100*a* with the lever 180 slid towards an end 1300 of the extended slot 130*c*. The aforementioned implementation of the removable safety catch is not limited to the embodiment of the safety block 1200 shown in FIG. 12A. The removable safety catch may be implemented in many ways. However, other implementations of the removable safety catch should be movable and/or removable, similar to the safety block 1200 shown in FIG. 12A.

Figure 14A:
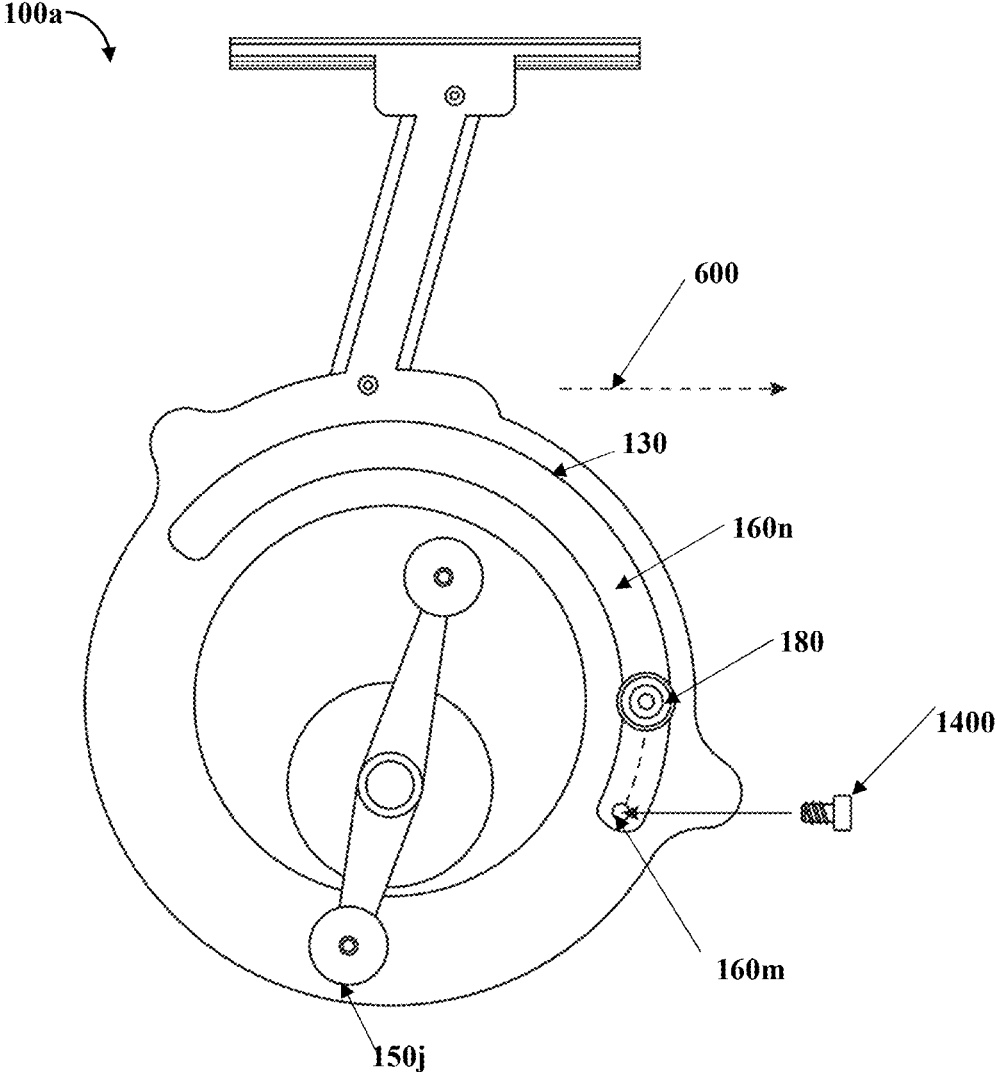
FIG. 14A illustrates another embodiment of the removable safety catch.
Figure 14B:
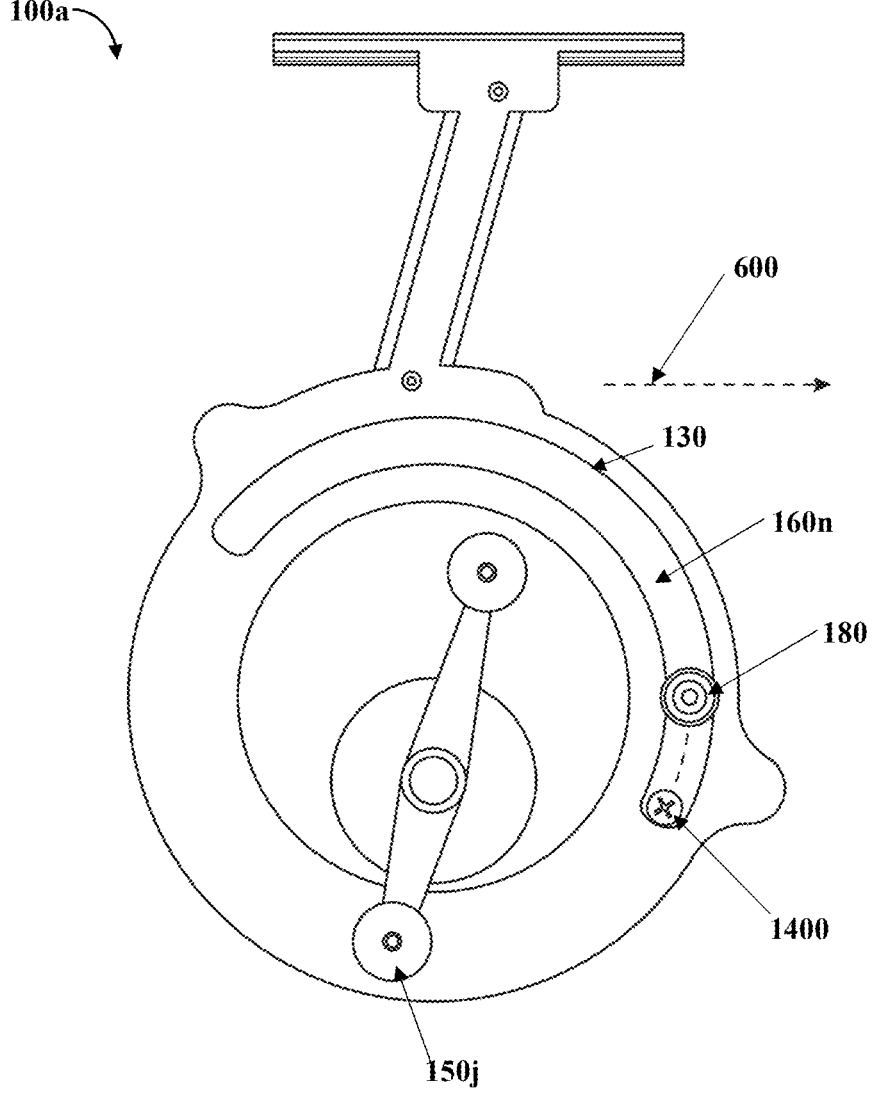
FIG. 14B illustrates a screw fastened into a screw hole in a rear portion of the body of rotatable line transfer member to act as a safety catch.

FIG. 14A illustrates another embodiment of the removable safety catch. The removable safety catch shown in FIG. 14A comprises a screw 1400. FIG. 14B illustrates the screw 1400 fastened into a screw hole 160*m* in a rear portion 160*n* of the reel body 150 of rotatable line transfer member 160 to act as a safety catch. The screw 1400 protrudes above the rear portion 160*n* of the reel body 150 of rotatable line transfer member 160 and into the slot 130. In an embodiment, a detachable pin or a similar object may be used instead of the screw 1400. The screw hole 160*m* is located proximal to the lever 180 such that when the rotatable line transfer member 160 is rotated in the second direction 600, as shown in FIG. 14A towards the third magnetic stop 150*g*, the screw 1400 fastened into the screw hole 160*m* contacts the end 1300 of the extended slot 130*c* instead of the lever 180. If the angler attempts to move the rotatable line transfer member 160 past the third magnetic stop 150*g* when the rotatable line transfer member 160 is in casting position, the screw 1400 contacts the end 1300 of the extended slot 130*c* and prevents the rotatable line transfer member 160 from being rotated in the second direction 600. The screw 1400 thereby prevents the tab 190*a* and the slot 190*b* from being aligned and thereafter allow the separation of the reel body 150 and the rotatable line transfer member 160. If the angler desires to rotate the rotatable line transfer member 160 beyond the casting position, the angler unscrews the screw 1400 from the screw hole 160*m* in the rear portion 160*n* of the reel body 150 of rotatable line transfer member 160. This will then enable the lever 180 to travel further towards the end 1300 of the extended slot 130*c*, rotating the rotatable line transfer member 160, causing the tab 190*a* and the slot 190*b* to align and allow the angler to separate the rotatable line transfer member 160 from the reel body 150. When desired, the reel body 150 and the rotatable line transfer member 160 are re assembled and positioned for operation of the fishing reel 100*a*, and the screw 1400 is fastened into the screw hole 160*m* to act as a safety stop.

The foregoing examples and illustrative implementations of various embodiments have been provided merely for explanation and are in no way to be construed as limiting of the embodiments disclosed herein. Dimensions of various parts of the fishing reel 100*a* and the rotatable line transfer member 160 disclosed above are exemplary, and are not limiting of the scope of the embodiments herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

I claim:

1. A fishing reel, comprising:
   a reel body;
   a spool mounted on the reel body with a central axis;
   a rotatable line-transfer member mounted on the reel body for rotation about the central axis between (i) a retrieve position in which a line slot of the rotatable line-transfer member substantially frictionlessly guides a fishing line to the spool during retrieval and (ii) a cast position in which the fishing line is permitted to pay out from the spool; and
   a lever extending through a slot in the reel body and operatively coupled to the line-transfer member, wherein the lever is engaged in slidable communication between a first end and a second end of the slot on the rotatable line-transfer member to rotate the rotatable line-transfer member to the retrieve position and the cast position, respectively.

2. The fishing reel of claim 1, wherein the rotatable line-transfer member comprises a dome-shaped body with a truncated top and the line slot comprises an L-shaped channel having a radial segment and a circumferential segment adjacent to a perimeter of the dome-shaped body of the rotatable line-transfer member.

3. The fishing reel of claim 2, wherein the radial segment extends through an opening of the truncated top, wherein the L-shaped channel of the line slot has a slanted L-shape with the circumferential segment of the slanted L-shape being parallel to circumference of the dome-shaped body of the rotatable line-transfer member, and wherein an angle between the circumferential segment and the radial segment of the slanted L-shape line slot is an acute angle.

4. The fishing reel of claim 2, wherein the dome-shaped body of the rotatable line-transfer member defines a cavity configured to partially surround the spool.

5. The fishing reel of claim 2, further comprising a detent positioned on the perimeter of the dome-shaped body of the rotatable line-transfer member adjacent to the circumferential segment of the reel body.

6. The fishing reel of claim 5, wherein the detent is a spring-loaded translational detent.

7. The fishing reel of claim 6, wherein the reel body further comprises a first conical notch adjacent the first end and a second conical notch adjacent the second end of the slot configured to releasably retain the line-transfer member in the retrieve and cast positions when the detent engages with the first conical notch and the second conical notch respectively.

8. The fishing reel of claim 2, further comprising a first magnetic stop positioned on the perimeter of the dome-shaped body of the rotatable line-transfer member adjacent to the circumferential segment of the reel body.

9. The fishing reel of claim 8, wherein the reel body further comprises a second magnetic stop adjacent the first end and a third magnetic stop adjacent the second end of the slot configured to releasably retain the line-transfer member in the retrieve and cast positions when the first magnetic stop engages with the second magnetic stop and the third magnetic stop respectively.

10. The fishing reel of claim 1, wherein reel body is a generally cylindrical receptacle configured to accommodate a plurality of rotating gears of the fishing reel.

11. The fishing reel of claim 1, wherein the lever comprises a bent extension extending from the lever, wherein the bent extension is angled about 90 degrees from the lever.

12. The fishing reel of claim 1 further comprises an extended slot extending beyond the second end of the slot.

13. The fishing reel of claim 12, wherein the extended slot is configured to accommodate a safety block.

14. The fishing reel of claim 1, wherein an inner perimeter of a generally cylindrical wall of a generally cylindrical receptacle of the reel body comprises a tab attached to the inner perimeter of the generally cylindrical wall, and wherein the rotatable line transfer member comprises a grooved lower perimeter comprising a slot.

15. The fishing reel of claim 1, wherein during the retrieval of the fishing line to the spool, the fishing line is wound directly in a straight line with line redirection of the fishing line, and while the fishing line is wound onto the spool, the fishing line is wound under tension without requiring a part of the reel body to be touched to provide control of the fishing line.

16. A fishing reel having a lever actuated rotatable line transfer member, comprising:

a reel body;

a spool mounted on the reel body with a central axis;

a rotatable line transfer member mounted to the reel body for rotation about the central axis between (i) a retrieve position in which a line slot of the rotatable line-transfer member guides a fishing line during retrieval and (ii) a cast position in which the fishing line is permitted to pay out from the spool, wherein the rotatable line transfer member comprises a circular base and a wire-frame projecting above and substantially spanning across a diameter of the circular base, wherein the wire frame defines the shape of a major circular sector of a circle that is disposed above the circular base on a horizontal plane, and wherein the line slot attaches the wire frame to the circular base; and a lever extending through a slot in the reel body and operatively coupled to the line-transfer member, the lever engaged in slidable communication between a first end and a second end of the slot in the reel body to rotate the rotatable line-transfer member respectively to the retrieve position and the cast position.

17. The fishing reel of claim 16, wherein the wire-frame of the rotatable line transfer member substantially spans across a diameter of the circular base, and wherein the rotatable line transfer member further comprises a support arm extending from the wire frame defining the shape of the major circular sector.

18. The fishing reel of claim 16, wherein the line slot comprises an L-shaped channel having a radial segment and a circumferential segment, wherein the radial segment extends between the circumferential segment of the L-shaped channel and an opening in the wire frame, wherein the opening is between ends of the major circular sector of the wire frame.

* * * * *